(12) United States Patent
Maruyama

(10) Patent No.: US 7,492,252 B2
(45) Date of Patent: Feb. 17, 2009

(54) RFID TAG AND METHOD FOR OBTAINING INFORMATION ON ARTICLE USING THE SAME

(75) Inventor: Kenji Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 11/783,870

(22) Filed: Apr. 12, 2007

(65) Prior Publication Data

US 2007/0236338 A1   Oct. 11, 2007

(51) Int. Cl.
*G08B 1/08* (2006.01)
*G06K 7/00* (2006.01)

(52) U.S. Cl. .................. 340/539.26; 235/435

(58) Field of Classification Search ............ 340/539.26, 340/10.41, 10.1, 10.2, 572.1–572.9, 573.1–573.3; 119/712; 235/435
See application file for complete search history.

(56) References Cited

FOREIGN PATENT DOCUMENTS

| JP | 2001-187611 | 7/2001 |
|---|---|---|
| JP | 2004-220175 | 8/2004 |

OTHER PUBLICATIONS

International Search Report of the International Published Application No. PCT/JP2004/015253 (mailed Feb. 1, 2005.

*Primary Examiner*—Jeff Hofsass
*Assistant Examiner*—Sigmund Tang
(74) *Attorney, Agent, or Firm*—Staas & Halsey LLP

(57) ABSTRACT

RFID tags assign computer-readable identification codes to articles and data is obtained from each RFID tag at points along which an article moves. Each RFID tag is separable into an article identification tag section, including an article identification code and a transmitter transmitting same, and an article information management tag section, including an obtaining device continuously obtaining article-related information of an article to which an RFID tag is assigned, a receiving device receiving the article identification code from the article identification tag section, a detecting device detecting the combination status of the article information and the article identification tag section, and a storage device storing the article identification code and the article-related information when the article information and article identification tag sections are in contact with each other.

19 Claims, 14 Drawing Sheets

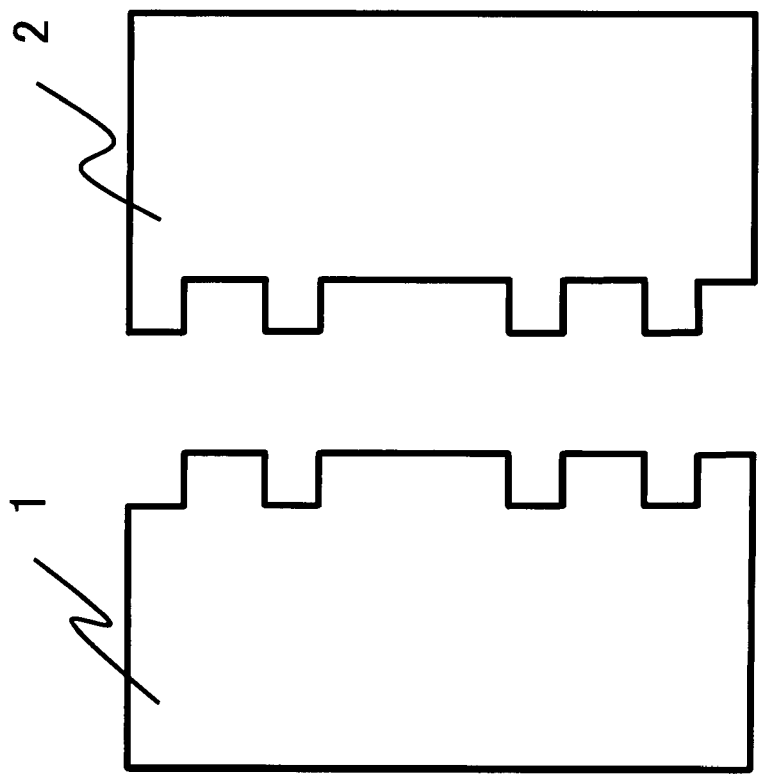
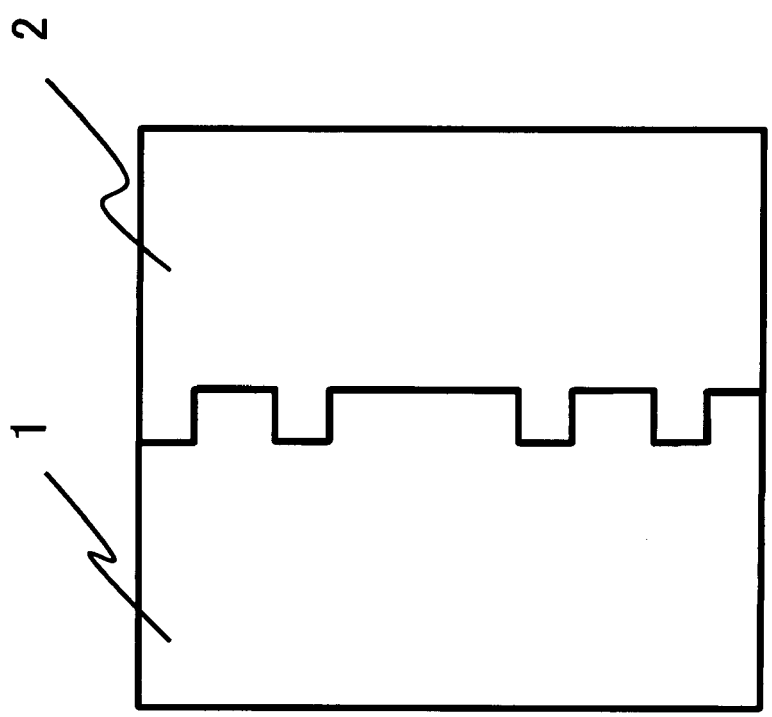

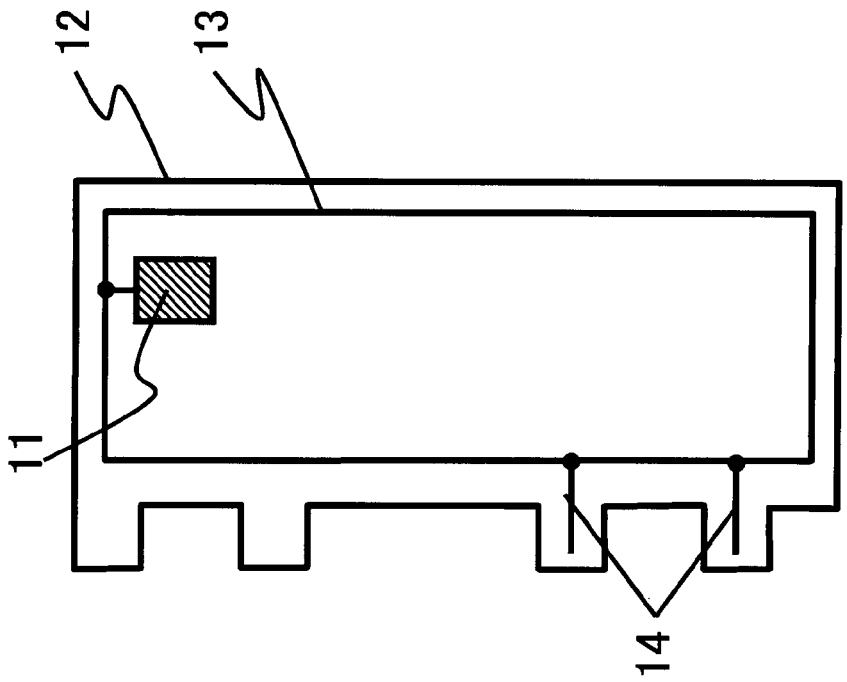
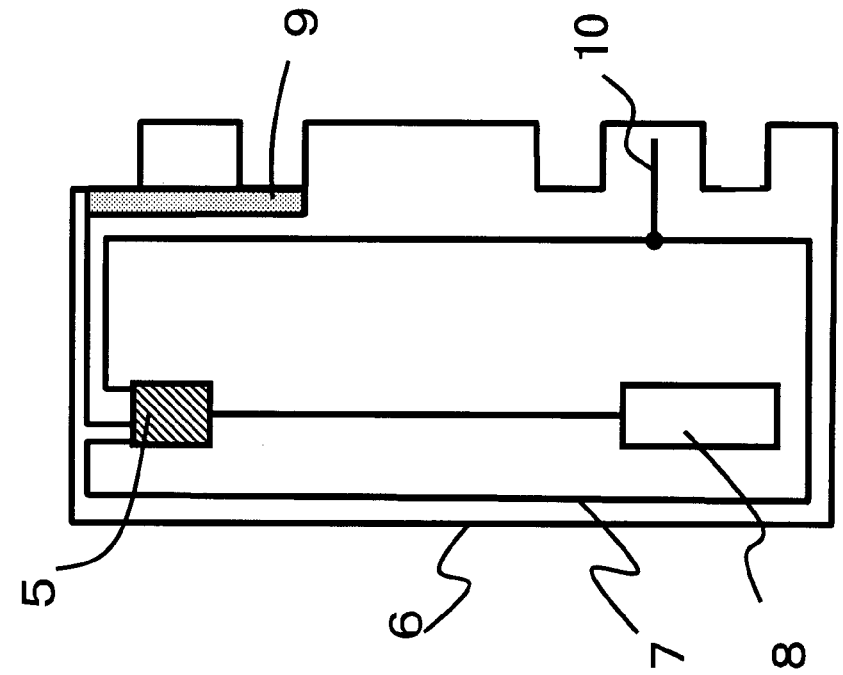

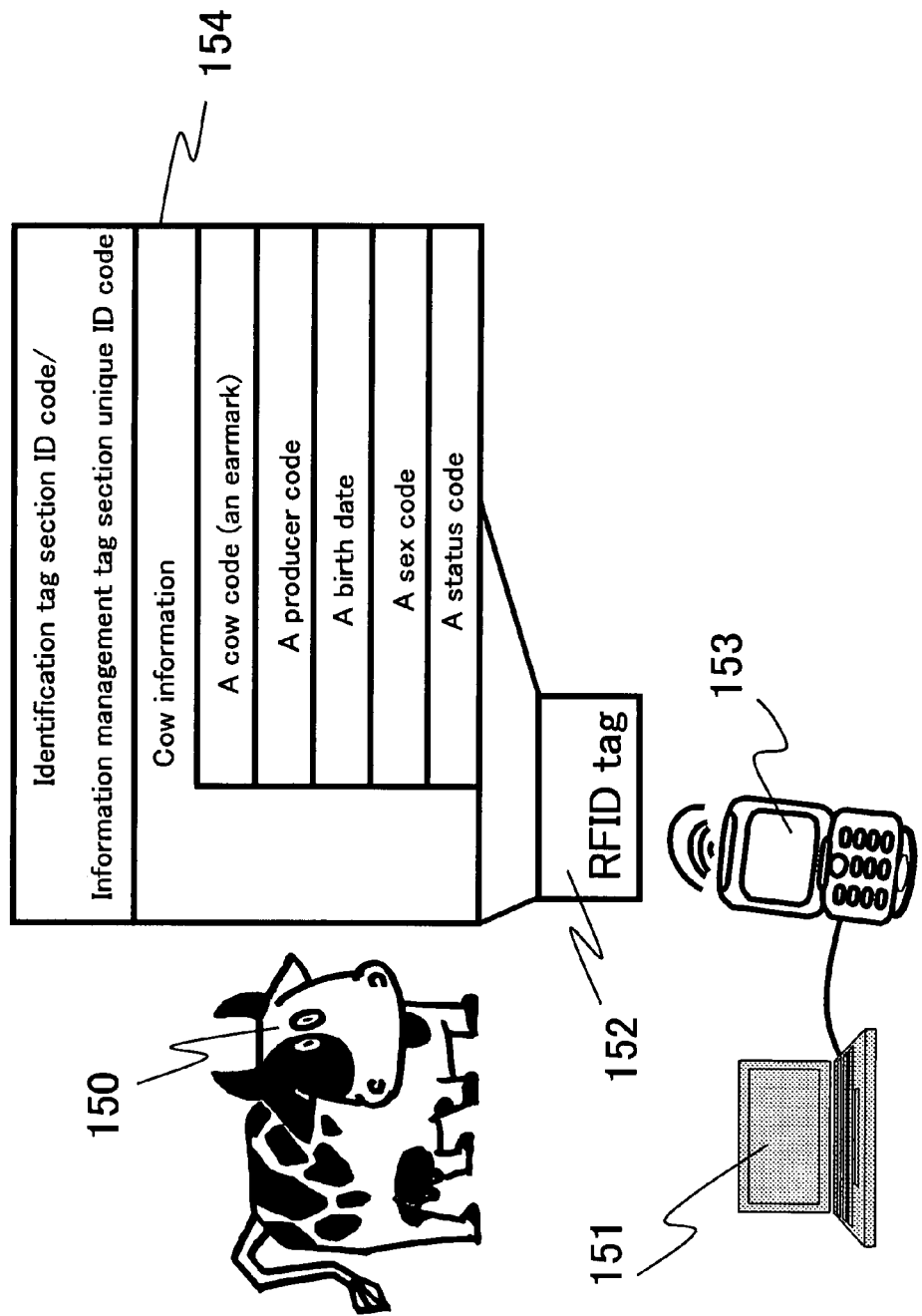
FIG.11 The step of linking an information management tag section to a cow

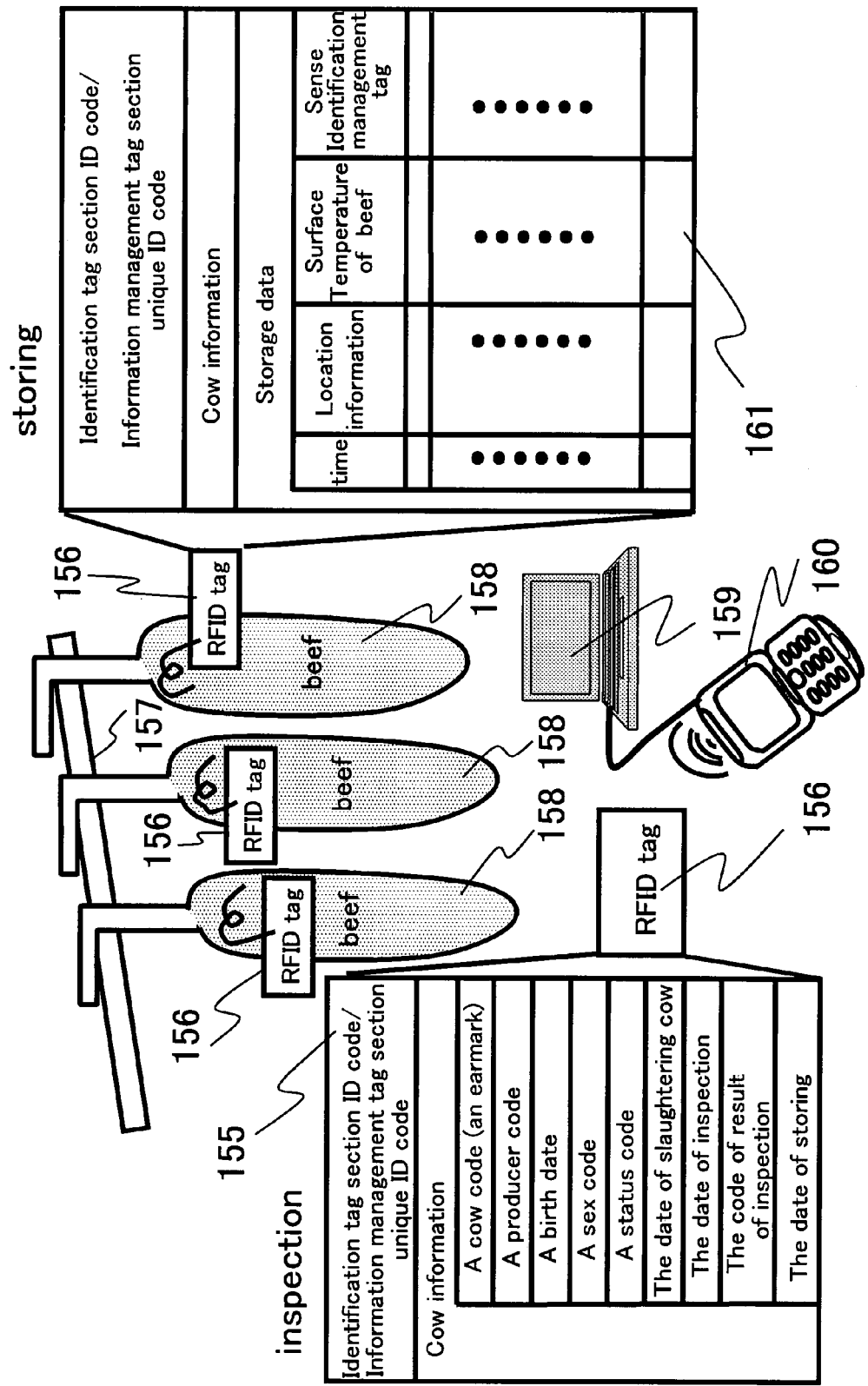
FIG.12 The step of inspecting and storing beef

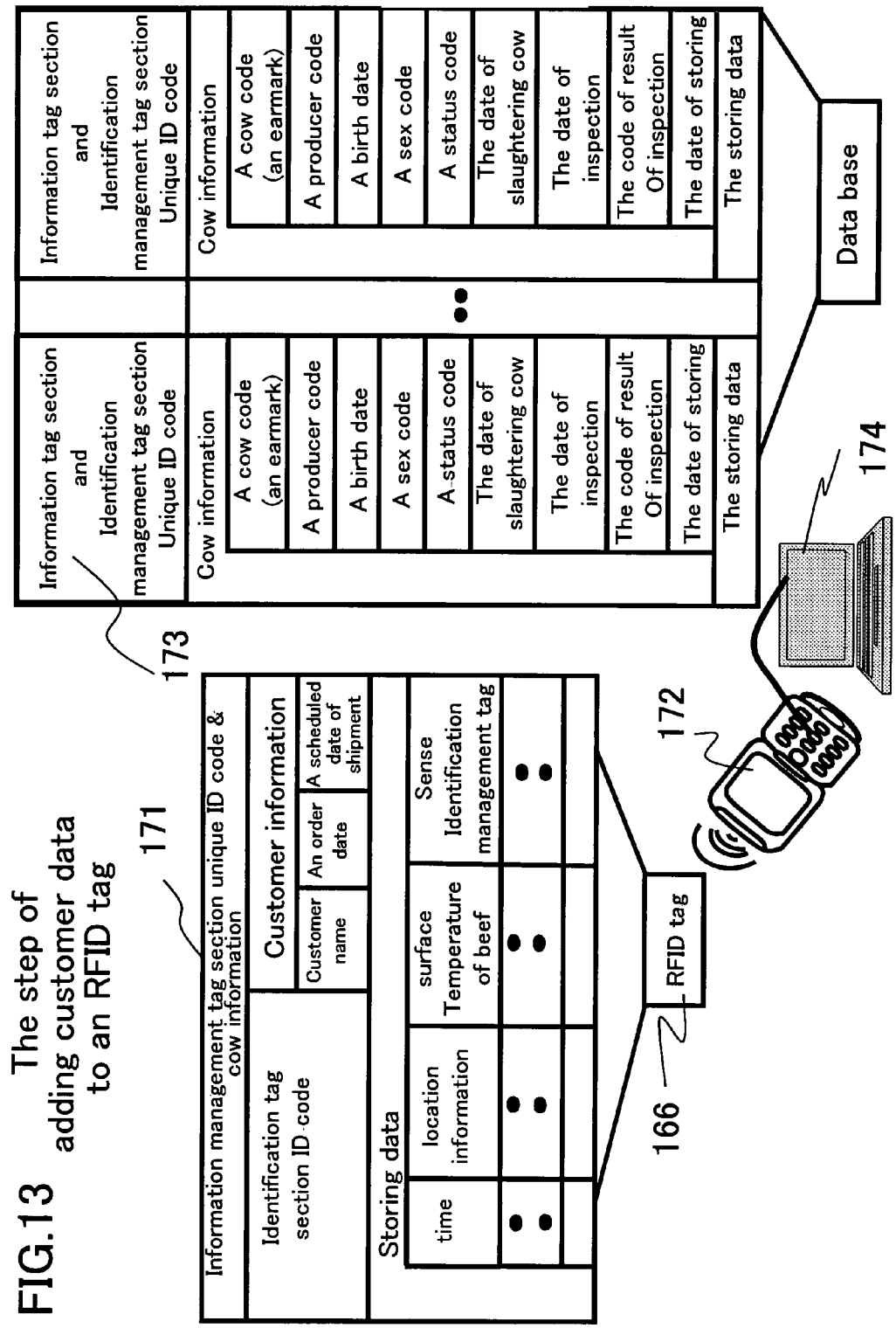
FIG.13  The step of adding customer data to an RFID tag

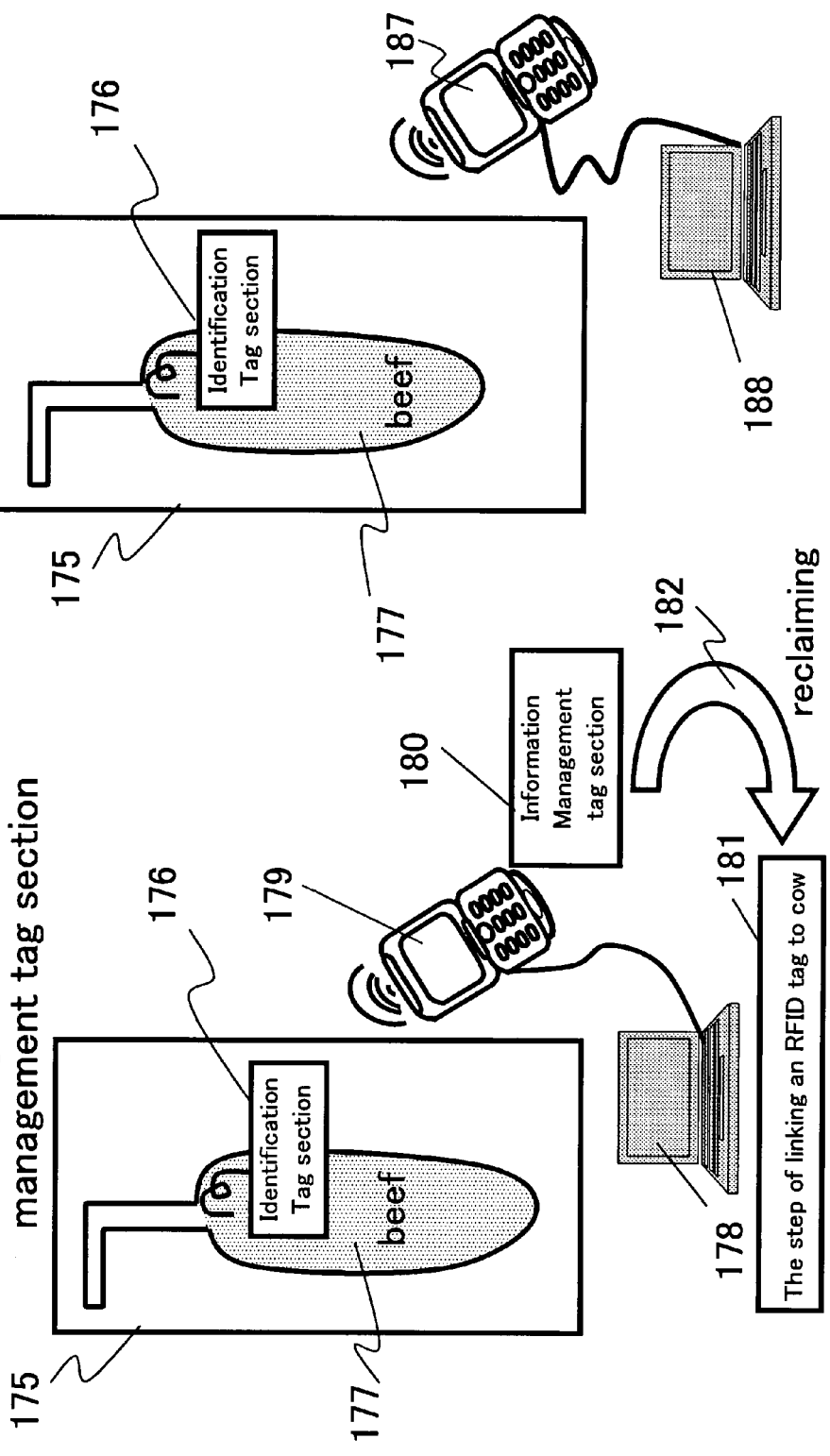
FIG.14A  The step of shipping beef and reclaiming an information management tag section
FIG.14B  The spec of check

RFID TAG AND METHOD FOR OBTAINING INFORMATION ON ARTICLE USING THE SAME

CROSS REFERENCE TO RELATED APPLICATIONS

This application is based on PCT Application No. PCT/JP2004/015253 filed Oct. 15, 2004, the disclosures of which are hereby incorporated herein by reference.

BACKGROUND OF THE INVENTION

1. Field of the Invention

The present invention relates to RFID tags for assigning computer-readable identification codes to actual articles, and in particular, relates to an RFID tag from which information on an article can be continuously obtained at many points on a route on which the article is moved.

2. Description of the Related Art

Recently, the use of radio frequency identification (RFID) tags that are a type of IC tag has been started. RFID tags are a tool that has a function similar to, for example, a function of tags that are attached to articles, i.e., a function of assigning unique identification codes to individual articles. Specifically, identification codes that can be read by, for example, computers are assigned to articles and are recognized by computers through radio communication (not an optical recognition method). In comparison with a case where known management methods are used in which, for example, tags or bar codes are used, in a case where RFID tags with such a recognition function are used, the efficiency of management of articles can be improved significantly.

In a general method for obtaining information related to articles from RFID tags, readers that read data from RFID tags are placed at key places, and information related to articles is obtained at (or near) the places where the readers are placed. Furthermore, as the use of RFID tags has increased, a demand has occurred that information on articles be continuously (successively) obtained at not only places where readers are placed but also many points.

For example, an RFID tag as shown in FIG. 1 is introduced as that satisfies the aforementioned demand.

The RFID tag shown in FIG. 1 includes a short-range RFID tag unit 270a that can perform communication in a relatively narrow range and a long-range RFID tag unit 270b that can perform communication in a broad range in a single RFID tag. Although the long-range RFID tag unit 270b can perform communication in a broad range (i.e., even when the long-range RFID tag unit 270b is distant from a reader, the long-range RFID tag unit 270b can perform communication), only an approximate location can be determined with the long-range RFID tag unit 270b. On the other hand, although the communication range of the short-range RFID tag unit 270a is narrower than that of the long-range RFID tag unit 270b, a detailed location can be determined with the short-range RFID tag unit 270a. The RFID tag shown in FIG. 1 includes such two different functions (especially, the effective range) in a single package so that the functions complement each other to enable continuous acquisition of pertinent information (for example, in a case where the RFID tag shown in FIG. 1 is attached to a person, information of the location of the person to whom the RFID tag is attached).

See, for example, Document 1: Japanese Patent Application Laid-Open No. 2004-46904 that disclosed a single RFID tag which include two types of RFID tag section.

The technique disclosed in aforementioned Patent Document 1 is a technique in which a single RFID tag includes two types of RFID tag sections, and a long-range RFID tag section is necessary. Thus, a problem exists in that the cost of the RFID tag is high compared with that of an RFID tag (that can perform only a short-range communication) that is generally used.

In general, an RFID tag is often discarded, remaining attached to an article (or detached from an article when management is not necessary). Thus, a high-cost RFID tag is not reused and is discarded, and this is not preferable in view of the economical efficiency. Moreover, regarding the environment, the following problem exists. In view of the amount of $CO_2$ generated when an RFID tag is fabricated, it is highly probable that the RFID tag in Patent Document 1 is large compared with a general one, thereby causing increase in the amount of $CO_2$ emissions in fabrication and increase in the environmental load.

SUMMARY OF THE INVENTION

The present invention was made in view of the above problems, and it is an object of the present invention to provide a low-cost RFID tag that does not increase the environmental load, from which information on an article can be continuously (successively) obtained at many points on a route on which the article is moved.

In one aspect, the invention provides an RFID tag that can be combined and separated. When the RFID tag is separated, one RFID tag segment includes an article identification tag section for identifying an article, and the other RFID tag segment includes an article information management tag section for managing article information. The article identification tag section includes an article identification code, and a transmission for transmitting the article identification code. The article information management tag section includes a obtaining device for continuously obtaining article-related information of an article to which the RFID tag is assigned, a receiving device for receiving the article identification code from the article identification tag section, a combination-status detecting device for detecting that the article information management tag section and the article identification tag section are combined, and a storage for storing the article identification code and the article-related information when the article information management tag section and the article identification tag section are in contact with each other.

The RFID tag according to the invention automatically obtains and stores article information on an article to which the RFID tag is assigned when the RFID tag is in a combined status.

In one aspect, the invention provides a method for obtaining information on an article that uses the RFID tag. The method includes a step of assigning the RFID tag to an article, a step of the article identification tag section of the RFID tag sending the article identification code, a step of the article information management tag section of the RFID tag obtaining the article-related information when the article, to which the RFID tag is assigned, is located outside the communication range of an RFID tag reader, a step of the article information management tag section of the RFID tag checking combination of the article information management tag section and the article identification tag section, a step of the article information management tag section of the RFID tag storing the article identification code and the article-related information, and a step of the RFID tag sending stored article information when the article, to which the RFID tag is assigned, is located in the communication range of the RFID tag reader.

The method for obtaining information on an article that uses the RFID tag described in the second invention functions as follows: After the RFID tag is assigned to an article, even when the article, to which the RFID tag is assigned, is located outside the communication range of the RFID tag reader, the RFID tag continuously stores article information on the article. Subsequently, when the article, to which the RFID tag is assigned, is moved into the communication range of the RFID tag reader, the RFID tag outputs article information obtained by the RFID tag when the article is located outside the communication range of the RFID tag reader.

BRIEF DESCRIPTION OF THE DRAWINGS

FIG. 7 shows exterior views of a package of the RFID tag according to the first embodiment.

FIG. 8 shows the structures of a package 6 including the identification tag section and a package 12 including the information management tag section.

FIG. 11 is an illustration showing a step of linking an information management tag section to a cow.

FIG. 12 is an illustration showing a step of inspecting and storing beef.

FIG. 13 is an illustration showing a step of adding customer data to an RFID tag.

FIG. 14 includes FIGS. 14A and 14B. The drawings show a step of shipping beef and reclaiming an information management tag section and a check step, respectively.

DETAILED DESCRIPTION OF THE PREFERRED EMBODIMENTS

The mode for carrying out the present invention will now be described using a first embodiment and a second embodiment.

First Embodiment

An RFID tag according to a first embodiment of the present invention is shown in FIGS. 2 to 9. The RFID tag according to the first embodiment includes an information management tag section for handling (or managing) information on an article and an identification tag section for identifying the article that are combined so that these sections can be detached from each other.

Figure 1:
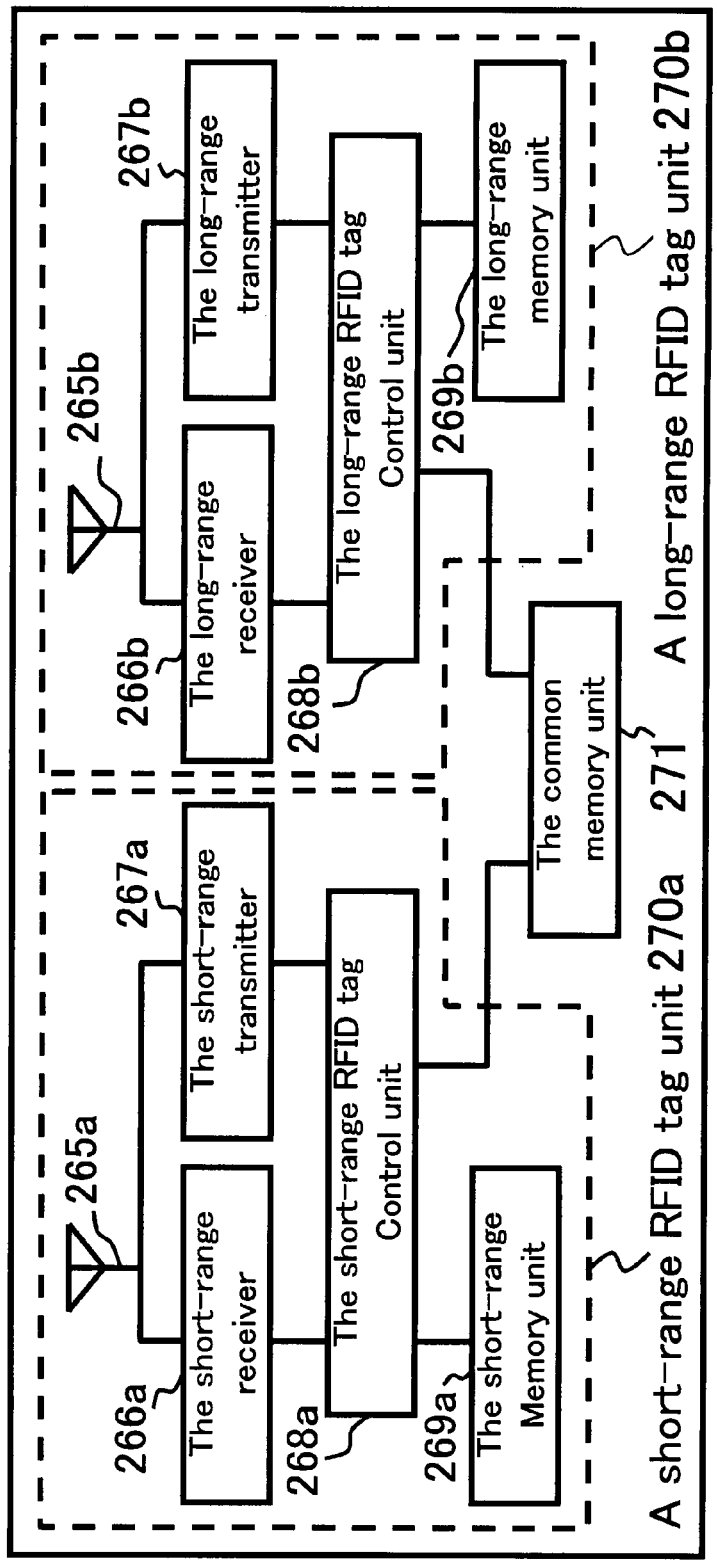
FIG. 1 is an illustration showing an RFID tag in Patent Document 1.
Figure 2:
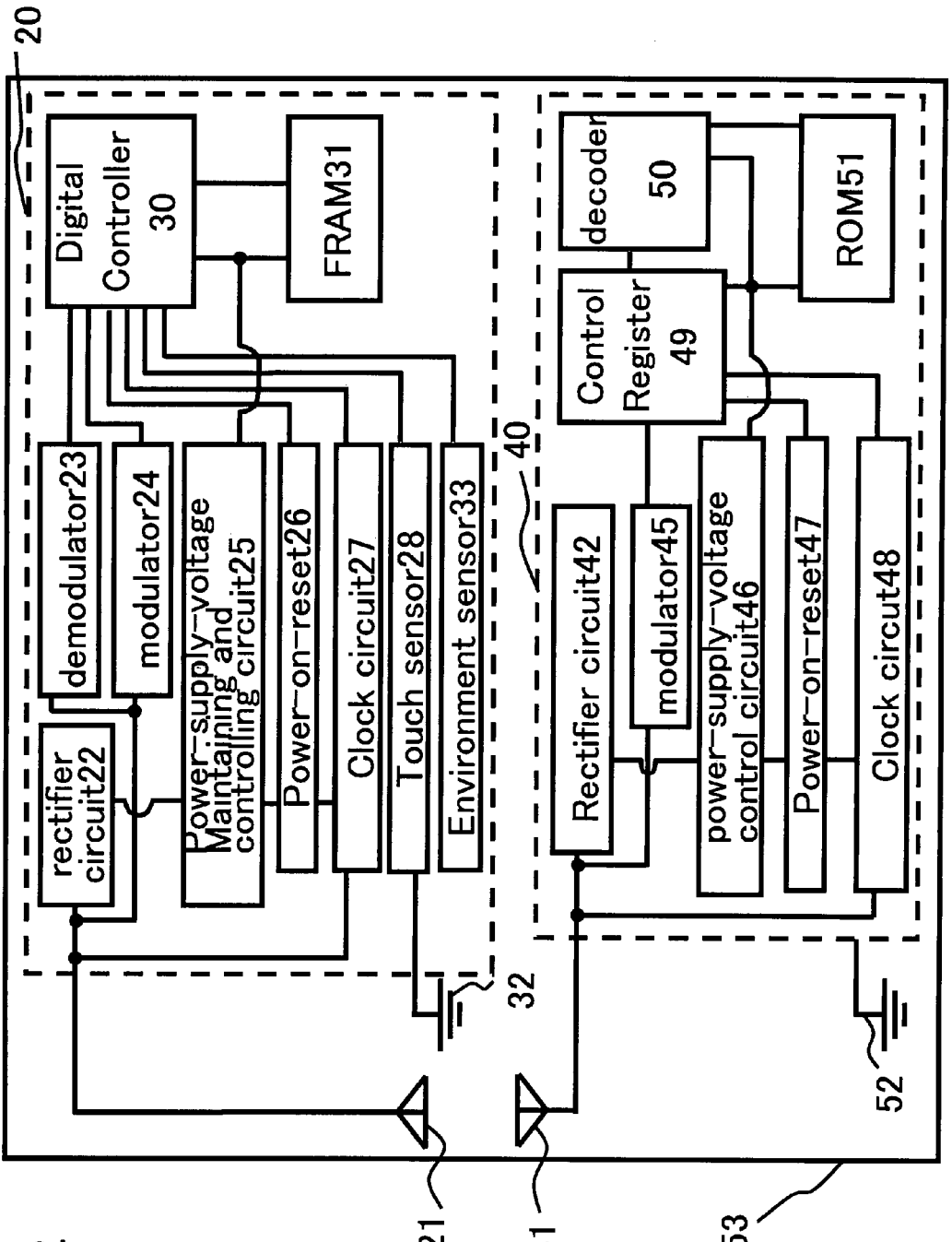
FIG. 2 is a circuit block diagram of an RFID tag according to a first embodiment.

FIG. 2 is a circuit block diagram of an RFID tag 53 according to the first embodiment. The RFID tag 53 according to the first embodiment includes circuit blocks of an information management tag section 20 and an identification tag section 40, as shown in FIG. 2. In the information management tag section 20 in FIG. 2, reference numeral 21 denotes an antenna, reference numeral 30 denotes a digital controller, reference numeral 31 denotes an FRAM, reference numeral 22 denotes a rectifier circuit, reference numeral 23 denotes a demodulator, reference numeral 24 denotes a modulator, reference numeral 25 denotes a power-supply-voltage maintaining and controlling circuit, reference numeral 26 denotes a power-on-reset circuit, reference numeral 27 denotes a clock circuit, reference numeral 28 denotes a touch sensor, reference numeral 33 denotes an environment sensor, and reference numeral 32 denotes a ground power supply.

The antenna 21 of the information management tag section 20 is used to send and receive radio waves to and from the identification tag section 40 or an RFID tag reader (not shown).

The power supply of the digital controller 30 is supplied from the power-supply-voltage maintaining and controlling circuit 25. Then, the digital controller 30 is reset in response to a reset signal from the power-on-reset 26 and operates upon receiving clock signals from the clock circuit 27. The digital controller 30 includes at least anticollision, an I/O, a command processing circuit, an FRAM access circuit, and location detection (not shown). The anticollision is firmware that realizes an algorithm that enables communication with a plurality of tags at the same time when the communication with the plurality of tags is performed. The I/O is a circuit that controls input and output signals from and to the demodulator 23 or the modulator 24. The command processing circuit is a circuit that generates commands or processes commands. The FRAM access circuit is a circuit that generates access signals for the FRAM 31 to handle data input and output. Specifically, the FRAM access circuit controls input and output of data stored or data to be stored in the FRAM 31. The location detection is firmware that realizes an algorithm for receiving signals from a global positioning system (GPS) satellite via the demodulator 23 and determining the location of the information management tag section 20 upon receiving radio waves from the GPS satellite via the antenna 21.

The digital controller 30 having such functions counts clock signals received from the clock circuit 27 and performs a location detecting operation at regular intervals. Thus, the digital controller 30 can obtain information of the location of an article at many points on a route on which the article is moved.

The algorithm for detecting the location of an RFID tag when the RFID tag receives radio waves sent from a GPS satellite has, for example, the following mechanism: Radio waves sent from a GPS satellite are first received, and then the time of transmission of the radio waves (i.e., the time indicated by a clock in the satellite when the radio waves are sent) included in the radio waves is obtained. Moreover, the time of receipt of the radio waves when the radio waves sent from the satellite are received (i.e., the time indicated by a clock in the RFID tag when the RFID tag receives the radio waves) is recorded. Then, the distance to the satellite is calculated from the period of time between the time of transmission of the radio waves and the time of receipt of the radio waves and the propagation velocity of the radio waves. The location of the RFID tag is detected by performing such a process between the RFID tag and a plurality of satellites the orbits (predetermined positions) of which are disclosed in advance.

The FRAM 31 receives access signals from the digital controller 30 and stores data from the digital controller 30 according to the access signals. The FRAM 31 also outputs data stored in the FRAM 31 to the digital controller 30. The data stored in the FRAM 31 includes the unique ID code of the information management tag section and information related to the unique ID code (pertinent information).

The rectifier circuit 22 rectifies radio signals received with the antenna 21. The power-supply-voltage maintaining and controlling circuit 25 smoothes the rectified radio signals and supplies the power supply voltage obtained by rectifying and smoothing the radio signals to the individual circuits in the information management tag section 20. Moreover, the power-supply-voltage maintaining and controlling circuit 25 includes, for example, a large-capacity capacitor (not shown) and has a function of maintaining the power supply voltage for a predetermined period when the radio signals for supplying the power supply voltage cannot be received.

The power-on-reset circuit 26 receives power supply from the power-supply-voltage maintaining and controlling circuit 25 and outputs a reset signal to the digital controller 30 upon receiving the power supply.

The clock circuit 27 receives radio signals from the antenna 21, generates clock signals, and supplies the clock signals to the digital controller 30. Even when the clock circuit 27 cannot receive radio signals, the clock circuit 27 continues to generate clock signals and supply the clock signals to the digital controller 30 during a period in which the clock circuit 27 receives power supply from the power-supply-voltage maintaining and controlling circuit 25.

The demodulator 23 has a function of separating radio signals received with the antenna 21 into signals and carrier waves. The modulator 24 modulates carrier waves on the basis of signals from the digital controller 30 and outputs the modulated carrier waves to the antenna 21.

The touch sensor 28 is a sensor that detects whether a part that includes the information management tag section 20 and a part that includes the identification tag section 40 are combined by being fitted together. When these parts are combined by being fitted together, the touch sensor 28 outputs a signal indicating that these parts are fitted together to the digital controller 30.

The environment sensor 33 outputs environmental data to the digital controller 30 in response to commands that are generated on the basis of count signals each of which is an integral multiple of a clock signal (count signals) and are output from the digital controller 30 at regular intervals. Environmental data is a type of information related to an article to which the RFID tag is attached (pertinent information) and is information on the environment around the article, for example, the surface temperature of the article or the humidity in the neighborhood of the article.

In the identification tag section 40 in FIG. 2, reference numeral 41 denotes an antenna, reference numeral 49 denotes a control register, reference numeral 50 denotes a decoder, reference numeral 51 denotes a ROM, reference numeral 42 denotes a rectifier circuit, reference numeral 45 denotes a modulator, reference numeral 46 denotes a power-supply-voltage control, reference numeral 47 denotes a power-on-reset circuit, reference numeral 48 denotes a clock circuit, and reference numeral 52 denotes a ground power supply. The rectifier circuit 42, the modulator 45, and the power-on-reset circuit 47 have functions similar to those of the information management, tag section 20.

The antenna 41 of the identification tag section 40 sends and receives radio waves to and from the information management tag section 20 or the RFID tag reader (not shown).

The clock circuit 48 receives radio signals from the antenna 41, generates clock signals, and supplies the clock signals to the control register 49.

The power supply of the control register 49 is supplied from the power-supply-voltage control circuit 46. Then, the control register 49 is reset in response to a reset signal from the power-on-reset 47 and operates upon receiving clock signals from the clock circuit 48. The control register 49 performs control so as to read a unique ID code stored in the identification tag section 40. Specifically, the control register 49 outputs control signals to the decoder 50 that controls the ROM 51. The decoder 50 sends address signals and command signals to the ROM 51, and the ROM 51 sequentially outputs the unique ID code of the identification tag section 40 in response to the address signals and the command signals from the decoder 50.

The power-supply-voltage control 46 smoothes rectified radio signals and supplies the obtained power supply voltage to the individual circuits in the identification tag section 40.

Figure 3:
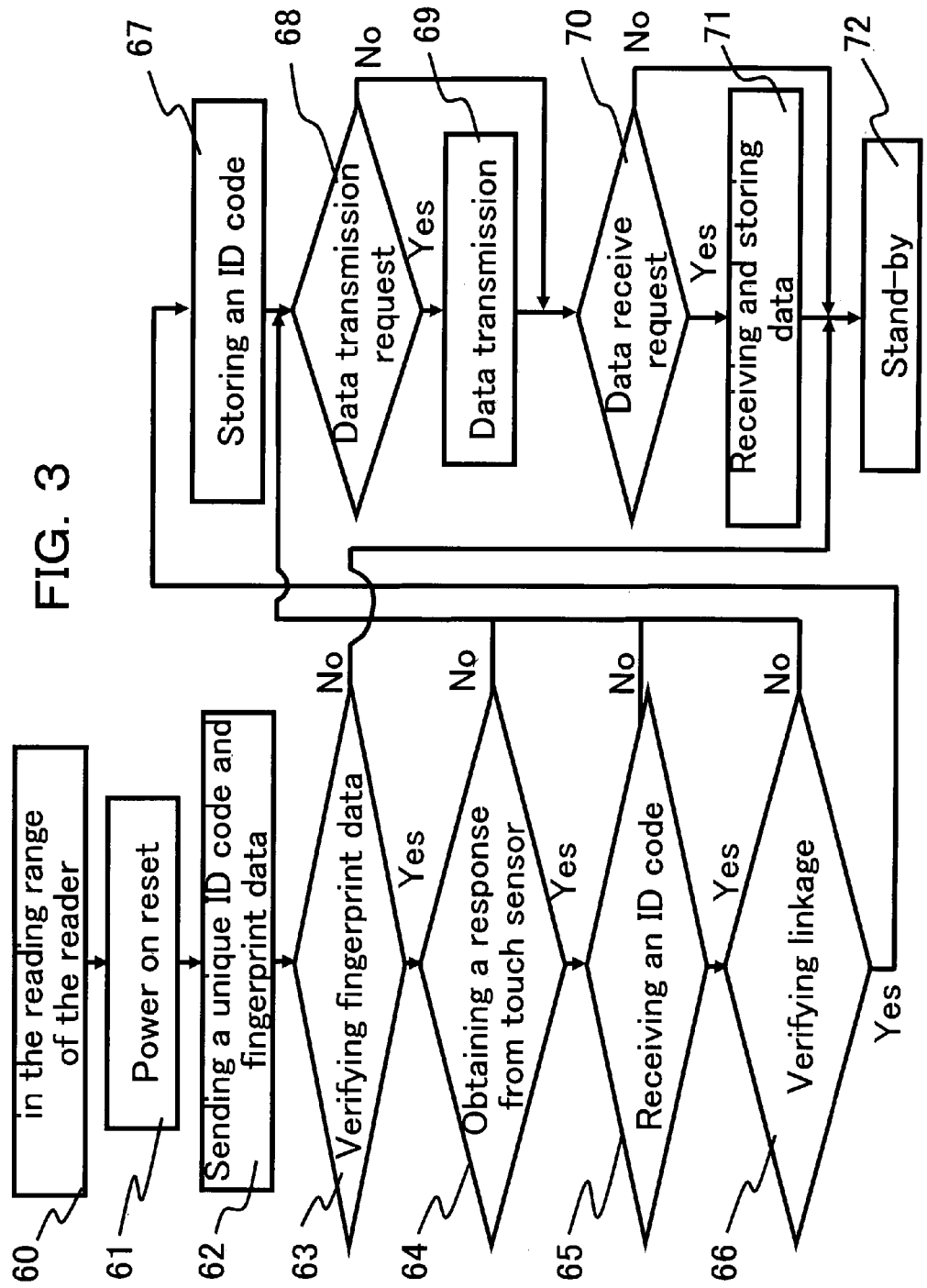
FIG. 3 is an illustration showing a flowchart of an operation in an information management tag section of the RFID tag according to the first embodiment in a case where the information management tag section is located within the reading range of a tag reader.

FIG. 3 is an illustration showing a flowchart of an operation in the information management tag section in a case where the RFID tag according to the first embodiment is located within the reading range of a tag reader. In FIG. 3, reference numeral 60 denotes a step performed in the reading range of a reader, reference numeral 61 denotes a step of power-on reset, reference numeral 62 denotes a step of sending a unique ID code and fingerprint data, reference numeral 63 denotes a step of verifying fingerprint data, reference numeral 64 denotes a step of obtaining a response from a touch sensor, reference numeral 65 denotes a step of receiving an ID code, reference numeral 66 denotes a step of verifying linkage, reference numeral 67 denotes a step of storing an ID code, reference numeral 68 denotes a step of data transmission request, reference numeral 69 denotes a step of data transmission, reference numeral 70 denotes a step of data receive request, reference numeral 71 denotes a step of receiving and storing data, and reference numeral 72 denotes a step of stand-by.

In step 60 performed in the reading range of a reader, when the information management tag section is moved into the reading range of the reader, the information management tag section receives radio waves sent from the reader.

In step 61 of power-on reset, the power supply of the information management tag section is turned on, and the power-on-reset circuit is activated. Then, a power-on reset operation is performed in the information management tag section.

In step 62 of sending a unique ID code and fingerprint data, the information management tag section sends a unique ID code and fingerprint data retained by the information management tag section. The fingerprint data retained by the information management tag section is the fingerprint data of a person who is eligible to handle the information management tag section.

In step 63 of verifying fingerprint data, the information management tag section compares fingerprint data that is obtained through a fingerprint sensor that is attached to the reader (not shown) and is sent from the reader with the fingerprint data of the eligible person stored in the information management tag section. When the fingerprint data of a person who handles the information management tag section agrees with the fingerprint data of the eligible person as a result of verifying the fingerprint data of the person who handles the information management tag section, the information management tag section starts the next operation. When the fingerprint data of the person who handles the information management tag section does not agree with the fingerprint data of the eligible person, the process proceeds to step 72 of stand-by.

In aforementioned step 63 of verifying fingerprint data, the reader (not shown) may compare the fingerprint data obtained through the fingerprint sensor attached to the reader with the fingerprint data sent from the information management tag section. Then, the reader sends the result of determination on whether these pieces of fingerprint data agree with each other to the information management tag section. When these pieces of fingerprint data agree with each other as a result of the determination, the information management tag section may start the next operation. When these pieces of fingerprint data do not agree with each other, the process may proceed to step 72 of stand-by.

Then, in step 64 of obtaining a response from a touch sensor, the information management tag section obtains a response (information on contact) from the touch sensor in the information management tag section and determines whether the part that includes the information management tag section 20 and the part that includes the identification tag section 40 are combined by being fitted together, so that these parts are in contact with each other. When the part that includes the information management tag section and the part that includes the identification tag section are combined (i.e., in contact with each other), the process proceeds to step 65 of receiving an ID code from the identification tag section. When the part that includes the information management tag section and the part that includes the identification tag section are not combined (i.e., separate from each other), the process proceeds to step 68 of data transmission request.

In step 65 of receiving an ID code, the reader (not shown) first receives a unique ID code from the identification tag section. Then, the reader sends the unique ID code of the identification tag section to the information management tag section. When the information management tag section has not received the unique ID code of the identification tag section, the process proceeds to step 68 of data transmission request. On the other hand, when the information management tag section has received the unique ID code of the identification tag section, the process proceeds to the next step.

In step 66 of verifying linkage, the information management tag section temporarily stores the unique ID code of the identification tag section. Then, the information management tag section compares the received unique ID code of the identification tag section with another unique ID code of an identification tag section that has been already stored. As a result, the information management tag section determines whether linkage with the identification tag section having the unique ID code has been already established. When the result of the comparison shows agreement between the ID codes, the process proceeds to step 68 of determining a data transmission request. When the ID codes do not agree with each other, the process proceeds to the next step.

In step 67 of storing an ID code, the information management tag section stores the unique ID code of the identification tag section.

In step 68 of data transmission request, the information management tag section determines whether the reader has sent a data transmission request. When the information management tag section determines that the reader has sent a data transmission request, the process proceeds to step 69 where the information management tag section sends data to the reader. On the other hand, when the information management tag section determines that the reader has not sent a data transmission request, the process proceeds to step 70 of data receive request.

In step 69 of data transmission, the information management tag section sends stored data to the reader.

In step 70 of data receive request, the information management tag section determines whether the reader has sent a data receive request. When the information management tag section determines that the reader has sent a data receive request, the process proceeds to step 71 where the information management tag section receives and stores data from the reader. On the other hand, when the information management tag section determines that the reader has not sent a data receive request, the process proceeds to step 72 of stand-by.

In step 71 of receiving and storing data, the information management tag section receives data from the reader and stores the data. Then, the process proceeds to step 72 of stand-by.

Figure 4:
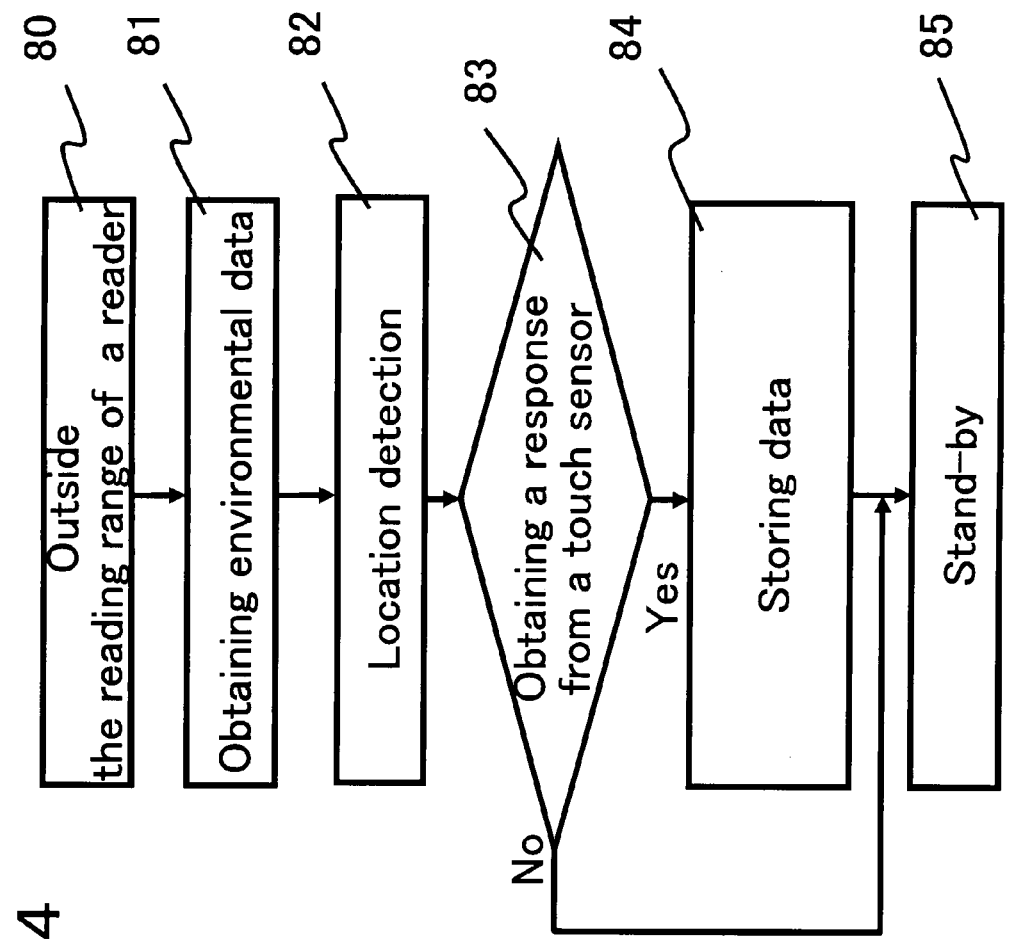
FIG. 4 is an illustration showing a flowchart of an operation in the information management tag section of the RFID tag according to the first embodiment in a case where the information management tag section is located outside the reading range of the reader.

FIG. 4 is an illustration showing a flowchart of an operation in the information management tag section in a case where the information management tag section of the RFID tag according to the first embodiment is located outside the reading range of the tag reader. In FIG. 4, reference numeral 80 denotes a step performed outside the reading range of a reader, reference numeral 81 denotes a step of obtaining environmental data, reference numeral 82 denotes a step of location detection, reference numeral 83 denotes a step of obtaining a response from a touch sensor, reference numeral 84 denotes a step of storing data, and reference numeral 85 denotes a step of stand-by.

In step 80 performed outside the reading range of a reader, when the information management tag section is moved outside the reading range of the reader, radio waves from the reader do not reach the information management tag section. However, the power supply voltage is maintained by the function of the power-supply-voltage maintaining and controlling circuit in the information management tag section.

In step 81 of obtaining environmental data, the information management tag section obtains environmental data from the environment sensor included in the information management tag section.

In step 82 of location detection, the information management tag section activates the firmware in the digital controller, which is used for location detection, to detect the location of the information management tag section. Then, the information management tag section obtains information of the location of the information management tag section.

In step 83 of obtaining a response from a touch sensor, the information management tag section obtains a response from the touch sensor included in the information management tag section. When no response has been returned from the touch sensor, the information management tag section proceeds to step 85 of stand-by. On the other hand, a response has been returned from the touch sensor, the information management tag section proceeds to step 84 of storing data.

In step 84 of storing data, the information management tag section stores the unique ID code of the identification tag section, the environmental data, and the location information. Then, the information management tag section is placed in the stand-by (85) status. When the information management tag section is located outside the reading range of the reader, the information management tag section repeats the process from step 81 of obtaining environmental data to step 84 of storing data at regular intervals.

Figure 5:
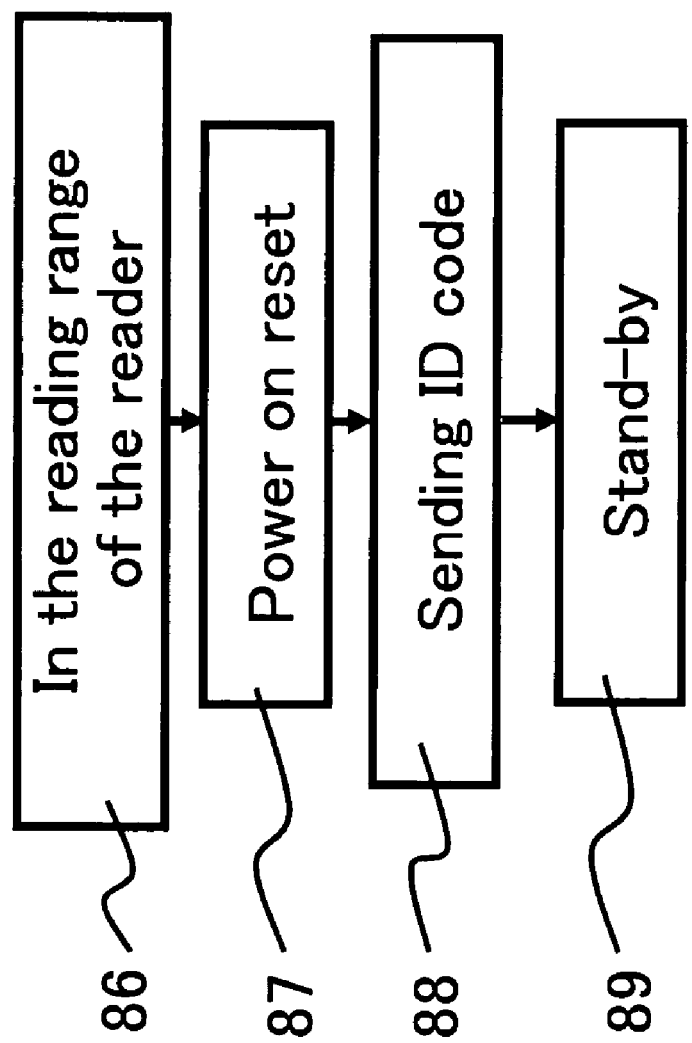
FIG. 5 is an illustration showing a flowchart of an operation in an identification tag section according to the first embodiment in a case where the identification tag section is located within the reading range of the reader.

FIG. 5 is an illustration showing a flowchart of an operation in the identification tag section according to the first embodiment in a case where the identification tag section is located within the reading range of the reader. In FIG. 5, reference numeral 86 denotes a step performed in the reading range of a reader, reference numeral 87 denotes a step of power-on reset, reference numeral 88 denotes a step of sending an ID code, and reference numeral 89 denotes a step of stand-by.

In step 86 performed when the identification tag section is located within the reading range, when the identification tag section is moved into the reading range, the identification tag section receives radio waves from the reader.

In step 87 of power-on reset, the power supply of the identification tag section is turned on, and the power-on-reset circuit in the identification tag section operates so that the circuits, which constitute the identification tag section, are reset by power-on reset.

In step 88 of sending an ID code, the identification tag section sends the unique ID code of the identification tag section. Then, the identification tag section is placed in a stand-by (89) status.

When the identification tag section according to the first embodiment is located outside the reading range of the reader, the identification tag section is in a stand-by (89) status.

Figure 6:
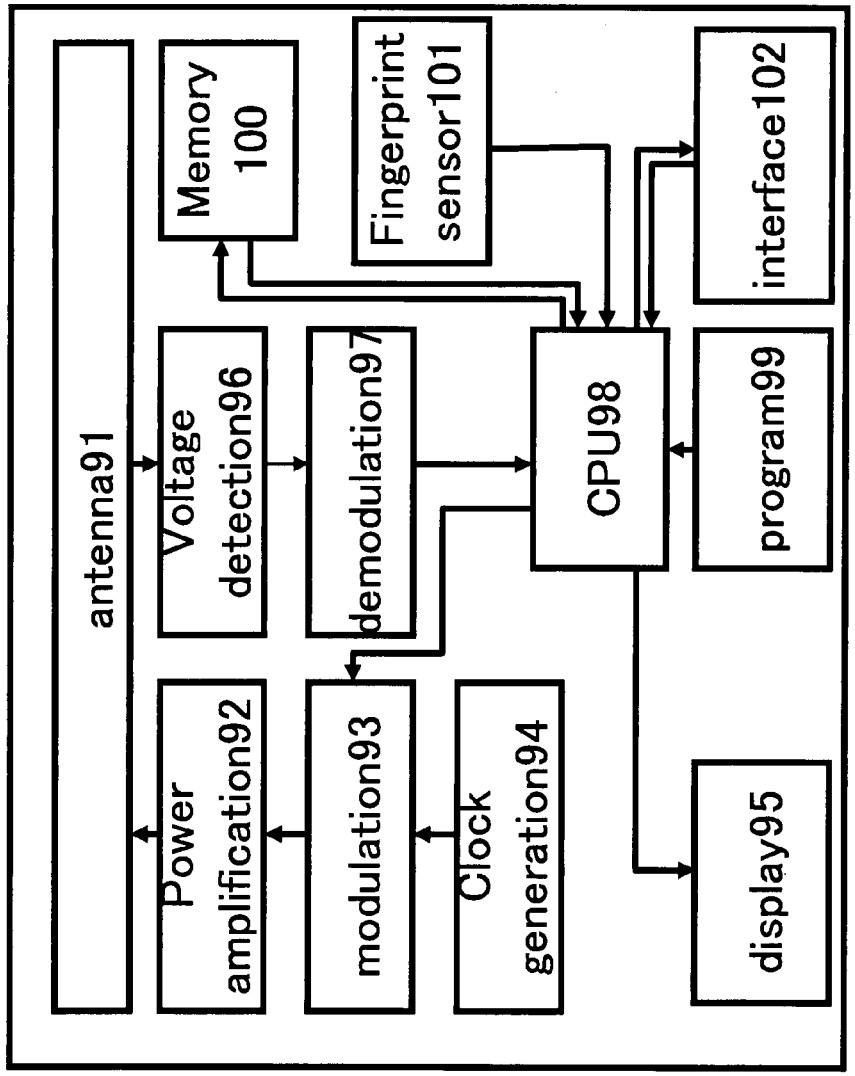
FIG. 6 is an illustration showing the reader related to the RFID tag according to the first embodiment.

FIG. 6 is an illustration showing a reader related to the RFID tag according to the first embodiment. In the reader in FIG. 6, reference numeral 94 denotes clock generation, reference numeral 93 denotes modulation, reference numeral 92 denotes power amplification, reference numeral 91 denotes an antenna, reference numeral 96 denotes voltage detection, reference numeral 97 denotes demodulation, reference numeral 100 denotes a memory, reference numeral 101 denotes a fingerprint sensor, reference numeral 102 denotes an interface, reference numeral 95 denotes a display, reference numeral 98 denotes a CPU, and reference numeral 99 denotes a program.

The clock generation 94 has a function of generating clock signals that are used as carrier signals of transmit radio waves. The modulation 93 has a function of modulating the carrier signals from the clock generation 94 according to signals from the CPU 98. The power amplification 92 has a function of amplifying the power levels of the modulated carrier signals and outputting the output to the antenna 91. The antenna 91 has a function of sending radio waves to the information management tag section or the identification tag section and a function of receiving radio waves from the information management tag section or the identification tag section. The voltage detection 96 has a function of detecting the voltages of radio waves received with the antenna 91. The demodulation 97 has a function of separating the radio signals detected by the voltage detection 96 into signals and carrier waves. The memory 100 is an area for temporarily storing data from the CPU 98. Thus, the memory 100 has a function of storing data and outputting stored data according to commands from the CPU 98. The fingerprint sensor 101 has a function of sensing the fingerprints of a person who handles the reader and converting the fingerprints to data. The interface 102 has a function of inputting and outputting data between the CPU 98 and a personal computer or between the CPU 98 and a server. The display 95 has a function of displaying, for example, information stored in the RFID tag or the status of the reader upon receiving commands from the CPU 98. The CPU 98 is a central processor that performs overall control of the reader and has an arithmetic function, a command output function, a memory control function, and a function of processing data related to the information management tag section or the identification tag section. The program 99 is a program that causes the reader to operate.

The reader in FIG. 6 has a function of supplying the power supply by sending radio waves to the information management tag section or the identification tag section. Moreover, the reader in FIG. 6 has a function of temporarily storing the unique ID code of the information management tag section or the identification tag section when the unique ID code is sent from the information management tag section or the identification tag section and recognizing the information management tag section or the identification tag section on the basis of a database stored in, for example, a server. Moreover, the reader has a function of performing the following operation upon recognizing the information management tag section or the identification tag section.

When the reader in FIG. 6 has recognized only the identification tag section, the reader queries a database of identification tag sections and information management tag sections via the interface on the basis of the unique ID code of the identification tag section. The reader in FIG. 6 determines whether the identification tag section has been already registered in the database and linked to the information management tag section. When the identification tag section has been linked to the information management tag section and registered, the reader in FIG. 6 displays article-related information in the database. The article-related information in the database is, for example, environmental data of an article obtained by the information management tag section. However, when the identification tag section has not been linked to the information management tag section, a message stating the status is displayed.

When the reader in FIG. 6 has recognized only the information management tag section, the reader queries the database of identification tag sections and information management tag sections via the interface on the basis of the unique ID code of the information management tag section. When the information management tag section is not registered, a message stating the status is displayed. On the other hand, when the information management tag section is registered, the reader in FIG. 6 activates the fingerprint sensor and displays a message stating that the fingerprints of a person who handles the reader need to be obtained by the fingerprint sensor.

When the fingerprint data has been obtained, the reader in FIG. 6 compares the fingerprint data with fingerprint data sent from the information management tag section to check whether the person who handles the reader is a person who is eligible to handle the information management tag section. When the pieces of fingerprint data do not agree with each other or when the fingerprint data cannot be verified, a message stating the status is displayed. On the other hand, when the pieces of fingerprint data agree with each other, the reader in FIG. 6 displays article-related information in the database related to the identification tag section and the information management tag section.

Moreover, when the pieces of fingerprint data agree with each other, the reader in FIG. 6 also displays management tag section information stored only in the information management tag section upon accepting a request from the person who handles the reader. The management tag section information stored only in the information management tag section is, for example, the customer information of an article to which the identification tag section is assigned or the personal information of a person to whom the identification tag section is assigned. Moreover, when the pieces of fingerprint data agree with each other, the reader in FIG. 6 sends a command to add data and additional data to the information management tag section to store the data only in the information management tag section upon accepting a request from the person who handles the reader.

When the reader in FIG. 6 has recognized both of the information management tag section and the identification tag section, the reader queries the database of identification tag sections and information management tag sections about the information management tag section and the identification tag section via the interface. When the information management tag section and the identification tag section are not registered, a message stating the status is displayed. On the other hand, when at least the information management tag section is registered, the reader in FIG. 6 activates the fingerprint sensor and displays a message stating that the fingerprints of the person who handles the reader need to be obtained by the fingerprint sensor.

When the fingerprint data has been obtained, the reader in FIG. 6 compares the fingerprint data with fingerprint data sent from the information management tag section to check whether the person who handles the reader is a person who is eligible to handle reading of the information management tag section. When the pieces of fingerprint data do not agree with each other or when the fingerprint data cannot be verified, a message stating the status is displayed. On the other hand, when the pieces of fingerprint data agree with each other, the person who handles the reader is prompted to select whether the person needs to link the information management tag section and the identification tag section.

When the person who handles the reader has entered data so as to link the information management tag section and the identification tag section, the unique ID code of the identification tag section is sent to the information management tag section. When the person who handles the reader does not link the information management tag section and the identification tag section, the reader in FIG. 6 displays the article-related information in the database related to the identification tag section and the information management tag section. Moreover, when the pieces of fingerprint data agree with each other, the reader in FIG. 6 also displays management tag article information stored only in the information management tag section upon accepting a request from the person who handles the reader. Moreover, when the pieces of fingerprint data agree with each other, the reader in FIG. 6 sends a command to add data and additional data to the information management tag section to add the data to the management tag article information stored in the information management tag section upon accepting a request from the person who handles the reader.

Thus, the reader in FIG. 6 has a function of improving the confidentiality or integrity (security) of the management tag information stored only in the information management tag section in combination with the functions of the information management tag section.

In the foregoing description, fingerprint data is used. Needless to say, data with which a person can be identified may be used, for example, the biological data of a person, such as the pattern of veins in the palm, the iris pattern, or the retina pattern, or biometrics data.

FIG. 7 shows exterior views of a package of the RFID tag according to the first embodiment. FIG. 7A shows a status in which a package 1 including the information management tag section and a package 2 including the identification tag section are combined in one unit. On the other hand, FIG. 7B shows a status in which the package 1 including the information management tag section and the package 2 including the identification tag section are separated from each other.

The thickness of the package 1 including the information management tag section is preferably about 0.5 mm to 2 mm in view of the packaging space. This is because the thickness of a semiconductor device in which the RFID tag is built is about 0.4 mm. However, considering the fact that a semiconductor device having a thickness of 0.1 mm or less can be implemented, the thickness of the package may be 0.5 mm or less. The shape of the package 1 including the information management tag section is rectangular, as viewed from the top, and at least one of the four sides is shaped such that it has protrusions and recesses. The thickness and shape of the package 2 including the identification tag section are similar to those of the package 1 including the information management tag section. The shapes of the protrusions and recesses of the cards are characterized in that the shapes are fitted together when the package 1 including the information management tag section and the package 2 including the identification tag section are in contact with each other at the sides having protrusions and recesses. That is to say, the relationship between the package 1 including the information management tag section and the package 2 including the identification tag section is like that between one stub and the other stub of what is called a tally. For example, the package 1 including the information management tag section is 2 centimeters long and 1 centimeter wide and is shaped such that four recesses, each side of which having a length of 0.2 millimeters, are disposed along the right side thereof. The package 2 including the identification tag section is 2 centimeters long and 1 centimeter wide and is shaped such that four protrusions, each side of which having a length of 0.2 millimeters, are disposed along the left side thereof. The protrusions have a shape such that the protrusions are fitted together with the recesses of the package 1 including the information management tag section.

The aforementioned package may be, for example, a solid plastic-like object such as a card, or a soft object such as a label.

Articles to which the RFID tag is assigned include ordinary articles, i.e., tangible articles other than real property, humans, other creatures, and intangible objects that can be individually traded.

In the foregoing description, a case was described in which the package 1 including the information management tag section and the package 2 including the identification tag section are adjacent to each other in the horizontal direction on a two-dimensional plane. Alternatively, the package including the information management tag section and the package including the identification tag section may be adjacent to each other in the vertical direction in a three-dimensional space. When the package including the information management tag section and the package including the identification tag section are adjacent to each other in the vertical direction, a plurality of protrusions exist on the central part of one of the packages, and through-holes corresponding to the protrusions exist in the other package. As a result, the one package and the other package are fitted together with the protrusions and the through-holes and combined.

FIG. 8 shows the structures of a package 12 including the identification tag section and a package 6 including the information management tag section.

In the package 6 including the information management tag section in FIG. 8A, reference numeral 7 denotes a loop antenna, reference numeral 10 denotes a rod antenna, reference numeral 9 denotes a touch sensor, reference numeral 5 denotes a semiconductor device including the information management tag section, and reference numeral 8 denotes an environment sensor.

The loop antenna 7 is constructed with a conducting wire that is disposed along sides of the package 6 including the information management tag section so as to surround the semiconductor device 5 including the information management tag section. The loop antenna 7 has a function of sending and receiving radio waves. The rod antenna 10 is constructed with a rod-like conducting wire that is disposed in a protrusion between two recesses of the package 6 including the information management tag section. The rod antenna 10 is connected to the loop antenna 7, and signals received with the rod antenna 10 are transmitted to the semiconductor device 5 via the loop antenna 7. The rod antenna 10 has a function of receiving radio waves from the identification tag section. The touch sensor 9 is disposed at a part of the package 6 including the information management tag section where no protrusion exists. The touch sensor 9 has a function of determining an object that opposes the touch sensor 9 and the touch sensor 9 are adjacent to each other when the capacitance between the object and the touch sensor 9 is equal to or larger than a predetermined value. Thus, the touch sensor 9 reacts to only an object that is fitted together and combined with the package 6 including the information management tag section. The semiconductor device 5 including the information management tag section is disposed at the upper left corner of the package 6 including the information management tag section. However, the semiconductor device 5 is not contact with the sides of the package 6 including the information management tag section. The environment sensor 8 is disposed at the lower left corner and functions as a sensor that obtains environmental data of an article to which the information management tag section is assigned. Environmental data is, for example, temperature, humidity, or moisture content.

The package 12 including the identification tag section in FIG. 8B is constituted by a semiconductor device 11 including the identification tag section, a loop antenna 13, and a rod antenna 14. The semiconductor device 11 including the identification tag section is disposed at the upper right corner. However, the semiconductor device 11 is not contact with sides of the package 12 including the identification tag section. The loop antenna 13 is constructed with a conducting wire that is disposed along the sides of the package 12 including the identification tag section so as to surround the semiconductor device 11 including the identification tag section. The loop antenna 13 has a function of sending and receiving radio waves. The rod antenna 14 is constructed with two rod-like conducting wires that protrude along the protrusions and is disposed at a location that sandwiches the rod antenna 10 of the package 1 including the information management tag section. The rod antenna 14 is connected to the loop antenna 13, and signals transmitted with the rod antenna 14 are transmitted from the semiconductor device 11 including the identification tag section via the loop antenna 13. The rod antenna 14 has a function of transmitting radio waves to the information management tag section.

In the foregoing description, a case was described in which the package including the information management tag section and the package including the identification tag section are adjacent to each other in the horizontal direction on a two-dimensional plane. Alternatively, the package including the information management tag section and the package including the identification tag section may be adjacent to each other in the vertical direction in a three-dimensional space. When the package including the information management tag section and the package including the identification tag section are adjacent to each other in the vertical direction, one of the packages and the other package are fitted together with protrusions and through-holes. The touch sensor is disposed near the base of a protrusion so that the touch sensor surrounds the protrusion. Thus, the touch sensor does not react unless the package including the through-holes is adjacent to and fitted together with the package including the protrusions. The antenna of the package including the protrusions includes a conducting wire that is disposed in a protrusion. The antenna of the package including the through-holes includes a conducting wire that is disposed so as to surround a through-hole.

Figure 9:
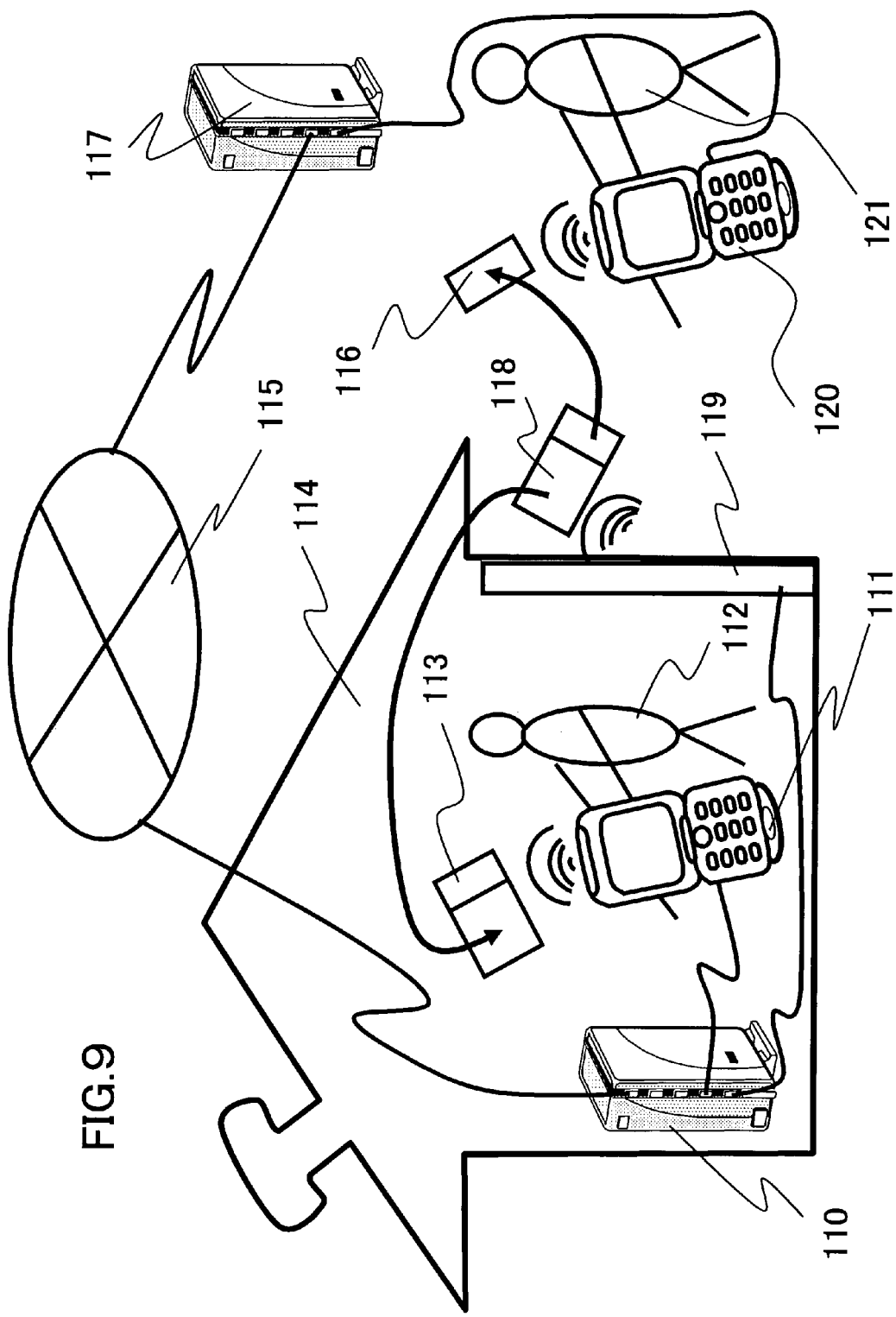
FIG. 9 is an illustration showing how the information management tag section and the identification tag section of the RFID tag are used, i.e., the reuse of the information management tag section.

FIG. 9 is an illustration showing the reuse of the information management tag section according to the present invention. In FIG. 9, reference numeral 110 denotes a management server, reference numeral 111 denotes a reader that sends and receives radio waves to and from an RFID tag, reference numeral 112 denotes a person who is eligible to handle an information management tag section, reference numeral 113 denotes the RFID tag in which the information management tag section and an identification tag section are combined, reference numeral 114 denotes a building that represents a specific area related to production of articles, reference numeral 115 denotes a network to which a server 117 for readers and the management server 110 are connected, reference numeral 116 denotes the identification tag section, reference numeral 117 denotes the server for readers, reference numeral 118 denotes the information management tag section, reference numeral 119 denotes a tag-location detecting unit, reference numeral 120 denotes a reader that sends and receives radio waves to and from the RFID tag, and reference numeral 121 denotes a person who has no authority to handle the information management tag section.

The management server 110 receives and manages information of the location of the RFID tag 113 detected by the tag-location detecting unit 119. The management server 110 further manages a database that includes information-management-tag-section-related information related to the information management tag section 118 and searches for information in the database on the basis of the unique ID code of the information management tag section 118 or the identification tag section 116. Managing a database device registering new information in and deleting unnecessary data from a database. The management server 110 further sends and receives information to and from the information management tag section 118 or the identification tag section 116 via the reader 111. However, when the tag-location detecting unit 119 has issued an alarm indicating that the information management tag section 118 is located outside the building 114, which represents the specific area related to production of articles, the management server 110 restricts transmission to and from the information management tag section 118 via the reader 111.

The server 117 for readers has a function of communicating with the management server 110 via the network 115. The server 117 for readers further sends and receives information to and from the information management tag section 118 or the identification tag section 116 via the reader 120.

The readers 111 and 120 have a function of sending and receiving radio waves to and from the RFID tag 113 and displaying information obtained by communication with the server 117 for readers and the management server 110. The readers 111 and 120 further has a function of obtaining the fingerprint data of a person who handles the RFID tag and determining whether the fingerprint data of the person who handles the RFID tag agrees with the fingerprint data of the person who is eligible to handle the information management tag section stored in the information management tag section. When the fingerprint data of the person who handles the RFID tag and the fingerprint data of the person who is eligible to handle the information management tag section do not agree with each other, display of information obtained by sending and receiving radio waves to and from the information management tag section 118 of the RFID tag 113 is restricted.

The tag-location detecting unit 119 has a function of communicating with the management server 110. The tag-location detecting unit 119 further detects the location of the RFID tag 113 by sending and receiving radio waves to and from the RFID tag 113. The tag-location detecting unit 119 further has a function of sending an alarm to the server 110 when the information management tag section 118 of the RFID tag 113 is found to be located outside the building 114 related to, for example, production of articles as a result of the location detection.

Thus, only when the person 112 (for example, a worker engaged in production of articles) who is eligible to handle the information management tag section swipes the RFID tag 113 through the reader 111 in the building 114 related to, for example, production of articles, management tag article information stored in the information management tag section of the RFID tag 113 can be read and written.

On the other hand, the person 121 (for example, a consumer or a purchaser) who has no authority to handle the information management tag section can perform an operation of reading information on an article that is linked to the identification tag section 116 in the database, for example, information related to production of the article and information related to authentication of the article, from the server 117, by swiping the identification tag section 116 through the reader and accessing the server 110 through the Internet 115. However, the person 121 who has no authority to handle the information management tag section 118 cannot perform an operation of reading information tag article information stored only in the information management tag section 118, for example, customer data. As a result, the confidentiality and integrity of the information tag article information in the information management tag section 118 can be improved.

When an article that is, for example, produced is shipped from the building 114, the person 112 who is eligible to handle the information management tag section preferably returns the information management tag section 118 to the building 114 and attaches only the identification tag section 116 to the article, which is, for example, produced. Moreover, when the information management tag section 118 is returned to the building 114, the person 112 who is eligible to handle the information management tag section preferably reuses the information management tag section 118 by attaching the information management tag section 118 to another article.

The RFID tag according to the first embodiment is an RFID tag in which the information management tag section and the identification tag section are combined so that these sections can be detached from each other and is characterized by the following features.

The RFID tag is characterized first in that the information management tag section includes a device for generating the power supply upon receiving radio waves, such as a rectifier and a power-supply-voltage control circuit, a power-supply-voltage maintaining and controlling circuit that maintains the generated power supply voltage even after radio waves do not reach, a digital controller that reads signals received from a reader and controls circuits in the information management tag section so as to detect the current location and verify biological information, for example, fingerprint information, a transmission such as a modulation circuit, a receiving device such as a demodulation circuit, a nonvolatile read/write memory device such as an FRAM, to which information related to the information management tag section is written, an environment sensor, and a touch sensor.

Thus, the RFID tag is characterized in that the information management tag section initially obtains the ID code of the identification tag section stored in a nonvolatile memory device of the identification tag section via a reader. Moreover, the RFID tag is characterized in that the information management tag section obtains information on an article to which the identification tag section is assigned, for example, location information or environmental information, at regular intervals. Moreover, the RFID tag is characterized in that, when the touch sensor has verified that the information management tag section and the identification tag section are combined, the information management tag section sequentially or successively stores the ID code of the identification tag section and the information on the article, to which the identification tag section is assigned, in the nonvolatile read/write memory device of the information management tag section.

Moreover, the RFID tag is characterized in that the identification tag section includes a device for generating the power supply upon receiving radio waves, such as a rectifier and a power-supply-voltage control circuit, a nonvolatile memory device such as a ROM, and a device for sequentially transmitting content stored in the nonvolatile memory device.

Thus, the RFID tag according to the first embodiment can continuously (successively) obtain and manage information on an article at many points on a route on which the article is moved.

Moreover, since the information management tag section and the identification tag section can be separated from each other, when management of information on an article by the RFID tag is not necessary any more, information on the article that has been continuously (successively) stored in the information management tag section is added to the database, and the information management tag section can be reclaimed and reused. On the other hand, the identification tag section remains attached to the article so that the article can be continuously identified. Thus, the RFID tag according to the first embodiment is economically efficient. Moreover, since the information management tag section is reclaimed and reused, the amount of $CO_2$ emissions due to production of the RFID tag can be reduced. Thus, the environmental load can be reduced.

The information management tag section and the reader related to the information management tag section have security protection functions such as fingerprint data verification. This results in an advantageous effect of improving the confidentiality or integrity (security) of information tag article information stored only in the information management tag section.

In general, a special memory circuit, for example, an FRAM, is used as a nonvolatile rewritable memory circuit used in the information management tag section with high functionality. Ferroelectric materials, for example, lead zirconate titanate (PZT) or strontium bismuth tantalate (SBT: $SrBi_2Ta_2O_9$), are used in the fabrication of a memory unit in such a special memory circuit. In view of resource exhaustion, the environmental load of substances, such as titan, bismuth, and strontium, that constitute these materials is large compared with that of silicon that is used in the fabrication of general semiconductor devices. Thus, when a large amount of these substances is discarded, the environmental load increases. In this case, the reuse of the information management tag section with high functionality results in an advantageous effect of reducing the environmental load.

In the first embodiment, fingerprint data is used. Alternatively, data with which a person can be identified may be used, for example, biological data, such as the pattern of veins in a palm, the iris pattern, or the retina pattern, or biometrics data. Moreover, in the first embodiment, an FRAM is used in the information management tag section. Alternatively, any nonvolatile memory device may be used, for example, an EEPROM, a flash memory, a magneto resistive random access memory (MRAM), a parameter random access memory (PRAM), or a resistance random access memory (RRAM). Data can be read from the nonvolatile memory device, and the data can be updated.

Second Embodiment

Figure 10:
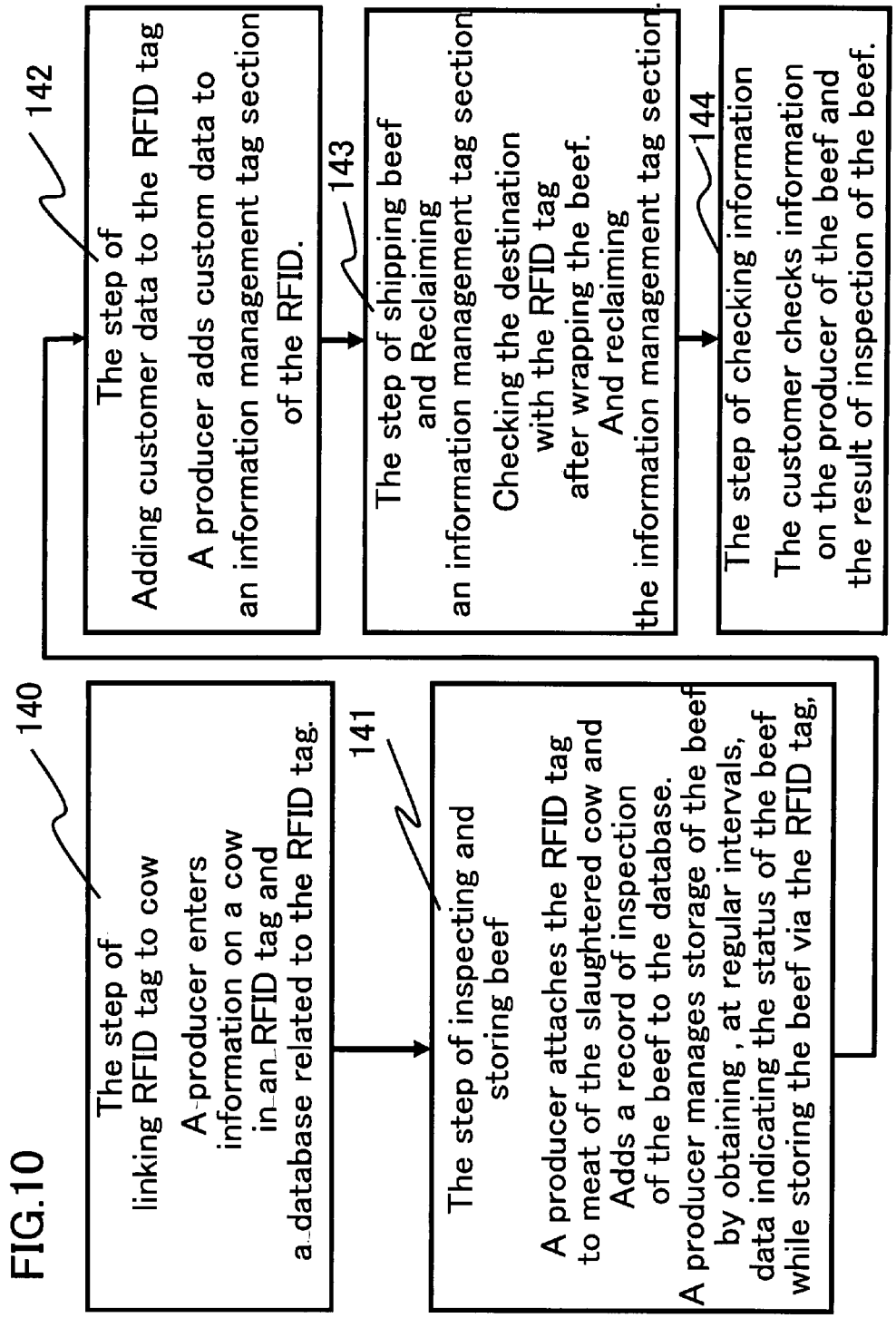
FIG. 10 is an illustration showing a flowchart of a meat management process.

A second embodiment shown in FIGS. 10 to 14 shows a concrete example where the RFID tag according to the first embodiment is used to manage beef. FIG. 10 is an illustration showing a flowchart of a meat management process. In the flowchart in FIG. 10, reference numeral 140 denotes a step of linking an RFID tag to a cow, reference numeral 141 denotes a step of inspecting and storing beef, reference numeral 142 denotes a step of adding customer data to an information management tag section, reference numeral 143 denotes a step of shipping beef and reclaiming an information management tag section, and reference numeral 144 denotes a check step.

Step 140 of linking an RFID tag to a cow is a step where a producer enters information on a cow in an RFID tag and a database related to the RFID tag and assigns the RFID tag to the cow.

In step 141 of inspecting and storing beef, the producer attaches the RFID tag to meat of the slaughtered cow and adds a record of inspection of the beef to the database. The producer further manages storage of the beef by obtaining, at regular intervals, data indicating the status of storage of the beef while storing the beef via the RFID tag.

Step 142 of adding customer data to an RFID tag is a step where the producer adds customer data to the information management tag section of the RFID tag attached to the beef.

Step 143 of shipping beef and reclaiming an information management tag section is a step of checking the destination with the RFID tag after wrapping the beef in a package, shipping the beef, and reclaiming the information management tag section. The reclaimed information management tag section is returned to step 140 of linking an RFID tag to a cow and reused.

Check step 144 is a step where the customer checks information on the producer of the beef, the result of inspection of the beef, the status of storage of the beef, and the like by performing an operation of reading the ID code of the identification tag section using a reader and accessing the database related to the RFID tag via a server.

The individual steps in FIG. 10 will now be described using FIGS. 11, 12, 13, 14A, and 14B. FIG. 11 is an illustration showing the step of linking an information management tag section to a cow. In FIG. 11, reference numeral 150 denotes a cow, reference numeral 152 denotes an RFID tag, reference numeral 154 denotes data to be stored in the RFID tag 152, reference numeral 153 denotes a reader, and reference numeral 151 denotes a personal computer. The data 154 to be stored in the RFID tag 152 includes an information-management-tag-section unique ID code, an identification-tag-section unique ID code, and cow information. Cow information includes, for example, a cow code (an earmark), a producer code, a birth date, a sex code, and a status code. A status code indicates the status of health of a cow. A status code is a code that indicates predetermined items, for example, ingredients of feed for a cow, a type of sickness from which a cow has suffered, and the weight.

In the step of linking an information management tag section to a cow in FIG. 11, a producer first enters data similar to the data 154 to be stored in the RFID tag 152 in a database related to the RFID tag 152 in the personal computer 151. Then, the producer sends the data 154 to be stored in the RFID tag 152 in the personal computer 151 to the RFID tag 152 by operating the reader 153 to write the data 154 to be stored in the RFID tag 152.

FIG. 12 is an illustration showing the step of inspecting and storing beef. In FIG. 12, reference numeral 156 denotes an RFID tag attached to meat, reference numeral 155 denotes data to be stored in the RFID tag 156 in an inspection process, reference numeral 157 denotes a support bar for hanging meat, reference numeral 158 denotes beef, reference numeral 160 denotes a reader, reference numeral 159 denotes a personal computer, and reference numeral 161 denotes data to be stored in the RFID tag 156 in a storage process.

The data 155 to be stored in the RFID tag 156 in an inspection process includes an information-management-tag-section unique ID code, an identification-tag-section unique ID code, and cow information. Besides the data 154 to be stored in the RFID tag 152 in FIG. 11, for example, a date of inspection of meat, a storage date, and an inspection result code are added as cow information. An inspection result code is a code that indicates, for example, the surface temperature, the moisture content of the surface, the number of germs per unit area, and the weight of meat. The producer enters data to be added to the data 155 to be stored in the RFID tag 156 in a database related to the RFID tag 156 in the personal computer 159. Moreover, the producer sends the data 155 to be stored in the RFID tag 156 in the personal computer 159 to the RFID tag 156 by operating the reader 160 to write the data 155 to the RFID tag 156.

The data 161 to be stored in the RFID tag 156 in a storage process includes an information-management-tag-section unique ID code, an identification-tag-section unique ID code, cow information, and storage data. Storage data is, for example, information of the surface temperature of beef that is obtained by the environment sensor included in the information management tag section, information on whether the touch sensor included in the information management tag section has sensed the identification tag section, location information that is obtained by a location detection function of the information management tag section, and the time when these pieces of information are obtained. Storage data is automatically obtained by the functions of the information management tag section and stored in the information management tag section.

FIG. 13 is an illustration showing the step of adding customer data to an RFID tag. In FIG. 13, reference numeral 166 denotes an RFID tag, reference numeral 167 denotes a database, reference numeral 171 denotes data stored by the RFID tag 166 in the step of adding customer data to the RFID tag 166, reference numeral 173 denotes data to be registered in the database 167 related to the RFID tag 166, reference numeral 172 denotes a reader, and reference numeral 174 denotes a personal computer. The data 171 stored by the RFID tag 166 includes customer information in addition to the data 161 to be stored in a storage process in FIG. 12. Customer information includes, for example, a customer name, an order date, and a scheduled date of shipment. The data 173 to be registered in the database 167 is similar to the data 161 to be stored in a storage process in FIG. 12 and does,not include customer information.

FIG. 14 includes FIGS. 14A and 14B. The drawings show the step of shipping beef and reclaiming an information management tag section and the check step, respectively. In FIG. 14A, reference numeral 180 denotes an information management tag section, reference numeral 176 denotes an identification tag section, reference numeral 177 denotes beef, reference numeral 175 denotes a package, reference numeral 178 denotes a personal computer, reference numeral 179 denotes a reader, reference numeral 181 denotes a step of linking an RFID tag to a cow, and reference numeral 182 denotes an arrow showing recycling.

In the step of shipping beef and reclaiming an information management tag section, the producer separates the RFID tag into the identification tag section and the information management tag section when shipping the beef. Then, the producer attaches the identification tag section to the beef and wraps the beef in the package. Then, the producer attaches the information management tag section to a destination label and sticks the destination label on the package. Then, when the beef is shipped, in a status in which the beef is wrapped in the package, the producer performs a final check by referring to the database in the personal computer 178 using the reader 179 on whether a customer who is recognized from the identification tag section 176 and the information management tag section 180 agrees with a destination indicated on the label. Then, the producer reclaims the information management tag section 180 to recycle, i.e., reuse, the information management tag section 180 in step 181 of linking an information management tag section to a cow, as shown by the arrow 182.

FIG. 14B is an illustration showing the check step in detail. In FIG. 14B, reference numeral 177 denotes beef, reference numeral 176 denotes an identification tag section, reference numeral 175 denotes a package, reference numeral 187 denotes a reader, and reference numeral 188 denotes a personal computer. The customer, to whom the meat is shipped, can retrieve information on, for example, the producer of the meat and the result of inspection of the meat by swiping the identification tag section 176 through the reader 187 and accessing the database in the personal computer managed by the producer via the personal computer 188 and the Internet. However, the customer cannot access the customer data stored only in the information management tag section.

The use of the RFID tag according to the first embodiment in beef management results in the following advantageous effects, as shown in the second embodiment.

The beef management according to the second embodiment, in which the RFID tag according to the first embodiment is used, has an advantageous effect of ensuring the confidentiality of customer data stored in the information management tag section by the functions of the information management tag section.

Moreover, the producer can separate the information management tag section in the RFID tag from the identification tag section in the RFID tag and reclaim the information management tag section for, for example, reuse. Thus, the RFID tag according to the first embodiment is economically efficient.

Moreover, in the step of storing a slaughtered cow, environmental data of an article to which the identification tag section is attached and information of the location of the information management tag section are continuously (successively) and automatically stored in the information management tag section at regular intervals by the functions of the information management tag section. Thus, management information on an article to which the identification tag section is attached is automatically accumulated by the information management tag section, thereby providing convenience.

INDUSTRIAL APPLICABILITY

According to the present invention, a low-cost and enviromentally friendly RFID tag can be provided, from which information on an article can be continuously obtained at many points on a route on which the article is moved.

Reference Numerals

1, 6 package including information management tag section
2, 12 package including identification tag section
5 semiconductor device including information management tag section
7 loop antenna
8 environment sensor
9 touch sensor
10 rod antenna
11 semiconductor device including identification tag section
13 loop antenna
14 rod antenna
20 information management tag section
21, 41 antenna
22, 42 rectifier circuit
23 demodulator
24, 45 modulator
25 power-supply-voltage maintaining and controlling circuit
26, 47 power-on-reset
27, 48 clock circuit
28 touch sensor
30 digital controller
31 FRAM
32, 52 ground power supply
33 environment sensor
40 identification tag section
46 power-supply-voltage control circuit
49 control register
50 decoder
51 ROM
53 RFID tag
60 in reading range of reader
61 power-on reset
62 sending unique ID code and fingerprint data
63 verifying fingerprint data
64 has response from touch sensor been obtained?
65 has ID code been received?
66 has linkage been checked?
67 storing ID code
68 data transmission request?
69 data transmission
70 data receive request?
71 receiving and storing data
72 stand-by
80 outside reading range of reader
81 obtaining environmental data
82 location detection
83 has response from touch sensor been obtained?
84 storing data
85 stand-by
86 in reading range of reader
87 power-on reset
88 sending ID code 89 stand-by
90 reader
91 antenna
92 power amplification
93 modulation
94 clock generation
95 display
96 voltage detection
97 demodulation
98 CPU
99 program
100 memory
101 fingerprint sensor
102 interface
110 management server
111, 120 reader
112 person who is eligible to handle information management tag section
113 RFID tag
114 building that represents specific area related to production of articles
115 network
116 identification tag section
117 server for readers
118 information management tag section
119 tag-location detecting unit
121 person who has no authority to handle information management tag section
140 step of linking RFID tag to cow
141 step of inspecting and storing beef
142 step of adding customer data to information management tag section
143 step of shipping beef and reclaiming information management tag section
144 check step
150 cow
151 personal computer
152, 156, 166 RFID tag
153 reader
154 data to be stored in RFID tag 152
155 data to be stored in RFID tag 156 in inspection process
157 support bar for hanging meat
158 beef
159 personal computer
160 reader
161 data to be stored in RFID tag 156 in storage process
167 database
171 data stored by RFID tag 166
172 reader
173 data to be registered in database 167 related to RFID tag 166
174 personal computer
175 package
176 identification tag section
177 beef
178, 188 personal computer
179, 187 reader
180 information management tag section
181 step of linking RFID tag to cow
182 arrow
265a, 265b antenna
266a short-range receiver
266b long-range receiver
267a short-range transmitter
267b long-range transmitter
268a short-range RFID tag control unit
268b long-range RFID tag control unit
269a short-range memory unit
269b long-range memory unit
270a short-range RFID tag unit
270b long-range RFID tag unit
271 common memory unit

What is claimed is:

1. An RFID tag comprising:
a first RFID tag segment having an article identification tag section for identifying an article, which includes:
an article identification code, and
a transmission device for transmitting the article identification code; and
a second RFID tag segment having an article information management tag section for managing article information, which includes:
an obtaining device for continuously obtaining article-related information of an article to which the RFID tag is assigned,
a receiving device for receiving the article identification code from the article identification tag section,
a combination-status detecting device for detecting that the article information management tag section and the article identification tag section are combined, and
a storage for storing the article identification code and the article-related information when the article information management tag section and the article identification tag section are in contact with each other,
wherein the first RFID segment and the second RFID tag segment are removable.

2. An RFID tag comprising:
a first RFID tag segment having an article identification tag section for identifying an article, which includes:
a first power-supply-voltage generating unit,
a first-clock-signal generating device for generating a first clock signal,
an identification-tag-section controlling device for controlling the article identification tag section,
a first storage including an article identification code for identifying at least an article, and
a first radio-wave sending and receiving device for sending and receiving radio waves; and
a second RFID tag segment having an article information management tag section for managing article information, which includes:
a second power-supply-voltage generating unit,
a second-clock-signal generating device for generating a second clock signal,
an article-related-information detecting device for detecting information related to an article,
a management-tag-section controlling device for controlling the article information management tag section,
a second storage device,
a combination-status detecting device for detecting that the article information management tag section and the article identification tag section are combined, and
a second radio-wave sending and receiving device for sending and receiving radio waves,
wherein the identification-tag-section controlling device reads the article identification code from the first storage device in response to the first clock signal and sends radio waves corresponding to the article identification code via the first radio-wave sending and receiving device, the management-tag-section controlling device counts the second clock signal and obtains the article-related information from the article-related-information detecting device at regular intervals, the management-tag-section controlling device obtains the article identification code from the article identification tag section via the second radio-wave sending and receiving device, and the management-tag-section controlling device stores the article identification code and the article-related information in the second storage device when recognizing by the combination-status detecting device that the article information management tag section and the article identification tag section are combined, wherein the first RFID segment and the second RFID tag segment are removable.

3. The RFID tag according to claim 1, wherein the device for continuously obtaining article information includes:

an environment sensing device for sensing environment of an article and outputting the environmental data; and a control device for performing control so as to count a clock and cause the environment sensing device to output the environmental data at regular intervals.

4. The RFID tag according to claim 2, wherein the article-related-information detecting device includes:

an environment sensing device for sensing environment of an article.

5. The RFID tag according to claim 1, wherein the device for continuously obtaining article information includes:

a receiving device for receiving radio waves from a GPS satellite and demodulating signals from the GPS satellite; and a control device having an algorithm for counting a clock and determining the current location from the signals from the GPS satellite at regular intervals.

6. The RFID tag according to claim 2, wherein the article-related-information detecting device includes:

a receiving device for receiving radio waves from a GPS satellite and demodulating signals from the GPS satellite; and a control device having an algorithm for counting a clock and determining the current location from the signals from the GPS satellite at regular intervals.

7. The RFID tag according to claim 1, wherein the storage device of the article information management tag section is an FRAM.

8. The RFID tag according to claim 2, wherein the second storage device is an FRAM.

9. The RFID tag according to claim 1, wherein the RFID tag segment including the article information management tag section and the RFID tag segment including the article identification tag section are shaped such that the RFID tag segments have protrusions and recesses and thus can be combined by being fitted together, and the combination-status detecting device of the article information management tag section is a touch sensor that is disposed in the recesses of the article information management tag section.

10. The RFID tag according to claim 2, wherein the RFID tag segment including the article information management tag section and the RFID tag segment including the article identification tag section are shaped such that the RFID tag segments have protrusions and recesses and thus can be combined by being fitted together, and the combination-status detecting device of the article information management tag section is a touch sensor that is disposed in the recesses of the article information management tag section.

11. A method for obtaining information on an article that uses a RFID tag that can be combined and separated wherein, when the RFID tag is separated, one RFID tag segment includes an article identification tag section for identifying the article, and the other RFID tag segment includes an article information management tag section for managing article information, the method comprising:

a step of assigning the RFID tag to the article;

a step of the article identification tag section of the RFID tag sending the article identification code;

a step of the article information management tag section of the RFID tag obtaining the article-related information when the article, to which the RFID tag is assigned, is located outside the communication range of an RFID tag reader;

a step of the article information management tag section of the RFID tag checking combination of the article information management tag section and the article identification tag section;

a step of the article information management tag section of the RFID tag storing the article identification code and the article-related information; and a step of the RFID tag sending stored article information when the article, to which the RFID tag is assigned, is located in the communication range of the RFID tag reader.

12. A method according to claim 11 for continuously obtaining information on an article that uses the RFID tag, the method further comprising:

a step of sensing environment of the article and outputting the environmental data; and a step of performing control so as to count a clock and cause the environment to output the environmental data at regular intervals.

13. A method according to claim 11 for continuously obtaining information on an article that uses the RFID tag, the method further comprising:

a step of receiving radio waves from a GPS satellite and demodulating signals from the GPS satellite; and a step of counting a clock and determining the current location from the signals from the GPS satellite at regular intervals.

14. A method according to claim 11 for continuously obtaining information on an article that uses the RFID tag, wherein in the step of storing the article identification code and the article-related information, the article identification code and the article-related information is stored to an FRAM.

15. A method according to claim 11 for continuously obtaining information on an article that uses the RFID tag, wherein a first RFID tag segment including the article information management tag section and a second RFID tag segment including the article identification tag section are shaped such that the first tag segment and the second RFID tag segment have protrusions and recesses and thus can be combined by being fitted together, and the combination-status detecting device of the article information management tag section is a touch sensor that is disposed in the recesses of the article information management tag section.

16. A method according to claim 11 for continuously obtaining information on an article that uses the RFID tag, the method further comprising:

a step of adding a customer data to the RFID tag;
a step of shipping the article to a customer; and reclaiming the article information management tag section of the RFID tag.

17. A method for obtaining information on an article that uses the RFID tag according to claim 1, the method comprising:
   a step of assigning the RFID tag to the article;
   a step of the article identification tag section of the RFID tag sending the article identification code;
   a step of the article information management tag section of the RFID tag obtaining the article-related information when the article, to which the RFID tag is assigned, is located outside the communication range of an RFID tag reader;
   a step of the article information management tag section of the RFID tag checking combination of the article information management tag section and the article identification tag section;
   a step of the article information management tag section of the RFID tag storing the article identification code and the article-related information; and
   a step of the RFID tag sending stored article information when the article, to which the RFID tag is assigned, is located in the communication range of the RFID tag reader.

18. A method for obtaining information on an article that uses the RFID tag according to claim 2, the method comprising:
   a step of assigning the RFID tag to the article;
   a step of the article identification tag section of the RFID tag sending the article identification code;
   a step of the article information management tag section of the RFID tag obtaining the article-related information when the article, to which the RFID tag is assigned, is located outside the communication range of an RFID tag reader;
   a step of the article information management tag section of the RFID tag checking combination of the article information management tag section and the article identification tag section;
   a step of the article information management tag section of the RFID tag storing the article identification code and the article-related information; and
   a step of the RFID tag sending stored article information when the article, to which the RFID tag is assigned, is located in the communication range of the RFID tag reader.

19. A method for obtaining information on a meat that uses the RFID tag that can be combined and separated wherein, when the RFID tag is separated, one RFID tag segment includes an article identification tag section for identifying the article, and the other RFID tag segment includes an article information management tag section for managing article information, the method comprising:
   a step of entering information on a cow in the RFID tag and data base related to the RFID tag;
   a step of attaching the RFID tag to meat of slaughtered cow;
   a step of the article identification tag section sending an identification code of the meat;
   a step of the article information management tag section of the RFID tag obtaining an information of the meat when the meat, to which the RFID tag is assigned, is located outside the communication range of an RFID tag reader;
   a step of the article information management tag section of the RFID tag checking combination of the article information management tag section and the article identification tag section;
   a step of the article information management tag section of the RFID tag storing the identification code of the meat and the information related to the meat;
   a step of the RFID tag sending stored the information of the meat when the meat, to which the RFID tag is assigned, is located in the communication range of the RFID tag reader
   a step of adding a customer data to the RFID tag;
   a step of shipping the article to a customer; and reclaiming the article information management tag section of the RFID tag.

* * * * *